US009261251B1

(12) United States Patent
Ladewig et al.

(10) Patent No.: US 9,261,251 B1
(45) Date of Patent: Feb. 16, 2016

(54) DOOR FOR OUTDOOR LIGHTING FIXTURE

(71) Applicants: Christopher Gerard Ladewig, Fayetteville, GA (US); Christopher Michael Bryant, Social Circle, GA (US); Sridhar Reddy Nimma, Cumming, GA (US)

(72) Inventors: Christopher Gerard Ladewig, Fayetteville, GA (US); Christopher Michael Bryant, Social Circle, GA (US); Sridhar Reddy Nimma, Cumming, GA (US)

(73) Assignee: Cooper Technologies Company, Houston, TX (US)

( * ) Notice: Subject to any disclaimer, the term of this patent is extended or adjusted under 35 U.S.C. 154(b) by 154 days.

(21) Appl. No.: 14/030,716

(22) Filed: Sep. 18, 2013

Related U.S. Application Data

(63) Continuation-in-part of application No. 13/464,528, filed on May 4, 2012, and a continuation-in-part of application No. 13/649,351, filed on Oct. 11, 2012.

(51) Int. Cl.

| | |
|---|---|
| ***B60Q 1/06*** | (2006.01) |
| ***F21V 29/00*** | (2015.01) |
| ***B60Q 3/00*** | (2006.01) |
| ***F21V 11/00*** | (2015.01) |
| ***F21S 13/10*** | (2006.01) |
| ***F21S 8/08*** | (2006.01) |
| ***F21K 99/00*** | (2010.01) |

(52) U.S. Cl.
CPC .. *F21S 8/085* (2013.01); *F21K 9/30* (2013.01)

(58) Field of Classification Search
CPC ....... F21V 29/004; F21V 31/03; F21V 15/01; F21W 2131/10; F21W 2131/103
See application file for complete search history.

(56) References Cited

U.S. PATENT DOCUMENTS

| | | | | | |
|---|---|---|---|---|---|
| 4,028,541 | A * | 6/1977 | Franklin | | 362/307 |
| 5,172,976 | A * | 12/1992 | Bogdanovs | | 362/374 |
| 5,615,947 | A * | 4/1997 | Shambo et al. | | 362/376 |
| 5,741,064 | A | 4/1998 | Chin et al. | | |
| 6,425,681 | B1 | 7/2002 | Agabekov | | |
| 6,652,117 | B2 | 11/2003 | Tsai | | |
| 7,028,629 | B2 | 4/2006 | Walcome | | |
| 7,611,264 | B1 | 11/2009 | Chang et al. | | |
| 7,674,005 | B2 | 3/2010 | Chung et al. | | |
| 7,771,087 | B2 | 8/2010 | Wilcox et al. | | |
| 7,837,362 | B2 | 11/2010 | Zhang | | |
| 7,909,489 | B2 | 3/2011 | Lin et al. | | |
| 7,967,469 | B2 | 6/2011 | Fang et al. | | |
| D646,419 | S * | 10/2011 | Chiang et al. | | D26/71 |

(Continued)

OTHER PUBLICATIONS

Cree, STR-SLM-3M-HT, LEDway SLM Streetlight, Product Specification Sheet, Jan. 5, 2012.

(Continued)

*Primary Examiner* — Evan Dzierzynski
*Assistant Examiner* — Erin Kryukova
(74) *Attorney, Agent, or Firm* — King & Spalding LLP

(57) ABSTRACT

A door for an outdoor lighting fixture can include a base portion and a cantilever portion. The base portion can include a first light source receiving area and at least one attachment recess, where the first light source receiving area is disposed on a bottom of the base portion. The cantilever portion can be disposed at a distal end of the base portion and can include a second light source receiving area disposed on a bottom side of the cantilever portion. The at least one attachment recess can be configured to receive a securing clip of a cabinet of the outdoor lighting fixture. The first light source receiving area can be configured to receive a first light source, and the second light source receiving area can be configured to receive a second light source.

20 Claims, 24 Drawing Sheets

(56) References Cited

U.S. PATENT DOCUMENTS

| | | | | |
|---|---|---|---|---|
| 8,092,049 | B2 | 1/2012 | Kinnune et al. | |
| 8,235,555 | B2 | 8/2012 | Thomas et al. | |
| 8,313,222 | B2 | 11/2012 | Kinnune et al. | |
| 8,360,613 | B2 | 1/2013 | Little, Jr. | |
| 8,585,258 | B2 | 11/2013 | Ham, II | |
| 8,616,730 | B2 | 12/2013 | Edwards et al. | |
| 8,845,116 | B2 * | 9/2014 | Kim et al. | 362/84 |
| 2005/0128752 | A1 | 6/2005 | Ewington et al. | |
| 2006/0181883 | A1 | 8/2006 | Hsu | |
| 2007/0064427 | A1 | 3/2007 | Sibalich et al. | |
| 2008/0037239 | A1 | 2/2008 | Thomas et al. | |
| 2008/0080196 | A1 * | 4/2008 | Ruud et al. | 362/373 |
| 2009/0251898 | A1 * | 10/2009 | Kinnune et al. | 362/249.02 |
| 2010/0027269 | A1 | 2/2010 | Lo et al. | |
| 2010/0039831 | A1 | 2/2010 | Liu et al. | |
| 2010/0134046 | A1 * | 6/2010 | Holder et al. | 315/297 |
| 2010/0254140 | A1 * | 10/2010 | Wen et al. | 362/249.02 |
| 2010/0302790 | A1 * | 12/2010 | Yen | 362/373 |
| 2011/0013402 | A1 | 1/2011 | Little, Jr. | |
| 2011/0060701 | A1 * | 3/2011 | Verfuerth et al. | 705/500 |
| 2011/0063832 | A1 * | 3/2011 | Hu et al. | 362/235 |
| 2011/0210676 | A1 * | 9/2011 | Beghelli | 315/185 R |
| 2011/0222284 | A1 | 9/2011 | Kong et al. | |
| 2011/0266282 | A1 | 11/2011 | Chu | |
| 2012/0008331 | A1 | 1/2012 | Marquardt et al. | |
| 2012/0087118 | A1 | 4/2012 | Bailey et al. | |
| 2012/0140433 | A1 | 6/2012 | Armer et al. | |
| 2012/0162980 | A1 * | 6/2012 | Mrakovich | 362/235 |
| 2012/0275162 | A1 | 11/2012 | Spiro | |
| 2012/0327641 | A1 | 12/2012 | Holder et al. | |
| 2013/0148360 | A1 * | 6/2013 | Jeon et al. | 362/294 |

OTHER PUBLICATIONS

Cree, STR-SLM66-2MB-HV, IP66 LEDway SLM Streetlight, Product Specification Sheet, Nov. 7, 2011.

Ruud Lighting, STR-LWY-IS-AA, IP66 LEDway SLM Streetlight, Type 1 Short, Product Specification Sheet, Aug. 11, 2011.

Cree, XSP1 Series LED Street Light, Product Specification Sheet, Apr. 10, 2012.

Cree, XSPI Series LED Street Light, Product Specification Sheet, Apr. 10, 2012.

* cited by examiner

DOOR FOR OUTDOOR LIGHTING FIXTURE

CROSS-REFERENCE TO RELATED APPLICATION

This application is a continuation in part of and claims priority to U.S. patent application Ser. No. 13/464,528, entitled "Outdoor Lighting Fixture," filed May 4, 2012, the entire content of which is hereby incorporated herein by reference.

This application is also a continuation in part of and claims priority to U.S. patent application Ser. No. 13/649,351, entitled "Power Door Lighting Fixture," filed on Oct. 11, 2012, the entire content of which is hereby incorporated herein by reference.

TECHNICAL FIELD

The present disclosure generally relates to aspects of lighting fixtures and, particularly, to doors of lighting fixtures used in outdoor lighting applications that incorporate light emitting diode (LED) light sources.

BACKGROUND

Outdoor lighting fixtures (sometimes such as those commonly referred to as roadway lighting fixtures or roadway fixtures) are commonly used to illuminate streets, highways, and parking lots, among other areas. These roadway fixtures typically include different types of lighting elements such as fluorescent, halogen, or incandescent lights. Beyond consuming a significant amount of power, these roadway lighting fixtures require routine maintenance as light sources generally have only a limited lifetime of operation before burning out. Some new roadway lighting fixtures utilize LED light sources. These roadway fixtures consume lower power and have lower operating expenses because the LED light sources have a significantly longer operating lifetime.

Particularly, with the longer operating lifetimes of the LED light sources, maintenance is required more sparingly to replace the LED light sources, as compared to other light sources. Further, the lower power consumption of the LED light sources leads to lower utility costs. These and other aspects have led to adoption of LED light sources in new roadway lighting fixtures. However, because of differences between the operating characteristics of the LED light sources and the fluorescent, halogen, or incandescent light sources, for example, many features of lighting fixtures that incorporate the LEDs must be redesigned. In this context, new lighting fixtures incorporating design characteristics particularly suited for LED light sources are necessary.

As one design consideration for new LED lighting fixtures, it is noted that advances in the field of LEDs may precipitate early replacement of legacy LED lighting fixtures (or portions thereof) with new LED lighting fixtures (or portions thereof). As it is anticipated that existing LED lighting fixtures (or portions thereof) may be replaced or upgraded in the future, new LED lighting fixtures should be designed to offer a simple and effective upgrade path.

SUMMARY

In general, in one aspect, the disclosure relates to a door for an outdoor lighting fixture. The door can include a base portion having a first light source receiving area and at least one attachment recess, where the first light source receiving area is disposed on a bottom of the base portion. The door can also include a cantilever portion disposed at a distal end of the base portion and having a second light source receiving area disposed on a bottom side of the cantilever portion. The at least one attachment recess can be configured to receive a securing clip of a cabinet of the outdoor lighting fixture. The first light source receiving area can be configured to receive a first light source. The second light source receiving area can be configured to receive a second light source.

In another aspect, the disclosure can generally relate to an outdoor lighting system. The outdoor lighting system can include a mounting pole, and a cabinet mechanically coupled to the mounting pole, where the cabinet has a length and has at least one securing clip. The outdoor lighting system can also include a door mechanically coupled to the cabinet. The door of the outdoor lighting system can include a base portion having substantially the length and having a first light source receiving area and at least one attachment recess, where the first light source receiving area is disposed on a bottom of the base portion, and where the at least one attachment recess receives the at least one securing clip to mechanically couple the base portion to the cabinet. The door of the outdoor lighting system can also include a cantilever portion disposed at a distal end of the base portion and having a second light source receiving area disposed on a bottom side of the cantilever portion. The outdoor lighting system can also include a first light source disposed within the first light source receiving area of the base portion, and a second light source disposed within the second light source receiving area of the cantilever portion. These and other aspects, objects, features, and embodiments will be apparent from the following description and the appended claims.

BRIEF DESCRIPTION OF THE DRAWINGS

For a more complete understanding of the example embodiments and the advantages thereof, reference is now made to the following description, in conjunction with the accompanying figures briefly described as follows.

Figure 1:
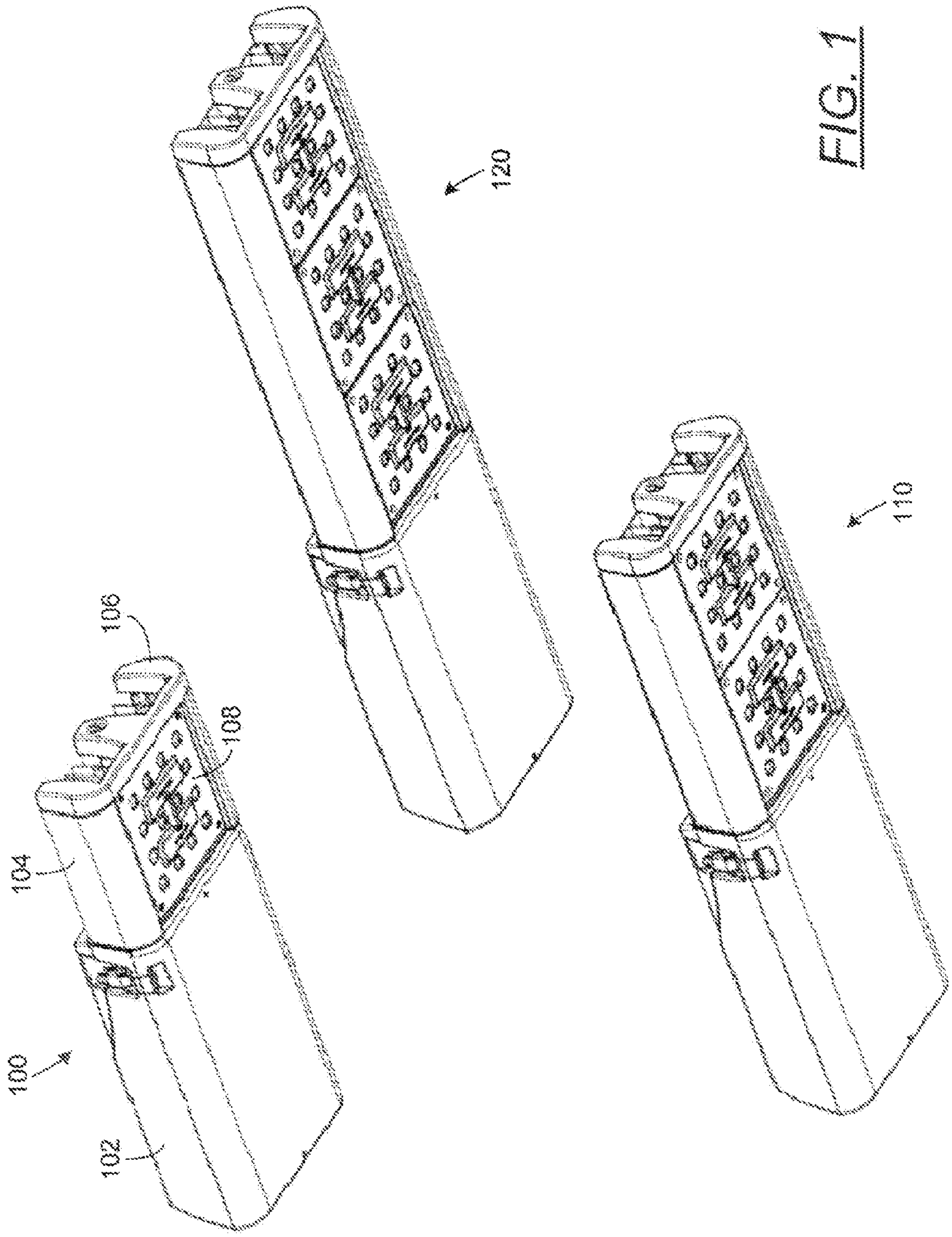
FIG. 1 provides a perspective view of outdoor lighting fixtures in accordance with certain example embodiments.

The drawings illustrate only example embodiments and are therefore not to be considered limiting of its scope, as other equally effective embodiments are within the scope and spirit of this disclosure. The elements and features shown in the drawings are not necessarily drawn to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

In the following paragraphs, the example embodiments are described in further detail by way of example with reference to the attached drawings. In the description, well-known components, methods, and/or processing techniques are omitted or briefly described so as not to obscure the embodiments. As used herein, the "present invention" refers to any one of the embodiments of the invention described herein and any equivalents. Furthermore, reference to various feature(s) of the "present invention" is not to suggest that all embodiments must include the referenced feature(s).

Turning now to the drawings, in which like numerals indicate like, but not necessarily the same or identical, elements throughout, example embodiments of the invention are described in detail. FIG. 1 provides a perspective view of lighting fixtures in accordance with certain example embodiments. Referring now to FIG. 1, three fixtures 100, 110, and 120 are illustrated. In certain example applications, the fixtures 100, 110, and 120 are suitable as outdoor lighting fixtures for illuminating roadways, parking lots, or parking garages (generally, referred to herein as "roadway fixtures"), for example, without limitation. The fixture 100 includes an enclosure 102, an extruded heatsink 104, a light source 108, and an end-cap 106. In various embodiments, certain fixtures can include a plurality of light sources 108. Particularly, the fixture 100 includes one light source 108, while the fixture 110 includes two, and the fixture 120 includes three.

In the example embodiments of FIG. 1, the example light sources 108 are rectangular or square light modules having an array of LEDs disposed on a substrate, in one case a circuit board, and can be generally referred to as light bars or light squares. The light sources 108 include a cover panel positioned over the circuit board and individual optics or lenses disposed over each LED or group of LEDs in the array and having at least a portion positioned between the cover plate and the circuit board. The cover panel can be transparent, translucent, or opaque. Alternatively, the cover panel is manufactured from acrylic or some other plastic and the optics are integrally formed with the cover plate. The cover plate can be metal or die cast with apertures that align with the optics.

As shown in FIG. 1, the example light source 108 includes a plurality of light emitting diodes (LEDs) mounted to a square substrate. Each of the LEDs includes semi-conductive material that is treated to create a positive-negative (p-n) junction. When the LEDs are electrically coupled to a power source, such as an LED driver, current flows through the junction, causing charge carriers to release energy in the form of incoherent light. In alternative embodiments, the light source 108 may include light sources other than LEDs, such as organic light emitting diodes (OLEDs), incandescent or miniature incandescent bulbs, compact florescent lights (CFLs), or other known light sources or combinations thereof.

The square substrate of the light source 108 can be mounted to the extruded heatsink 104 in various embodiments using screws, bolts, clips, tabs, adhesives, or other suitable mechanical fastening means. An example means for mounting the light source 108 to the extruded heatsink 104 is described below with reference to FIGS. 8 and 9. The extruded heatsink 104 is in thermal communication with the light source 108 to receive heat emitted from the light source 108 via conduction and disperses the heat, such as by both conduction and convection, to maintain a long operating lifetime of the light source 108. One end of the extruded heatsink 104 is mounted to an attachment face of the enclosure 102, as described in further detail below. Further, the end-cap 106 is mounted to another end of the extruded heatsink 104, as illustrated in FIG. 1 and described in further detail below. In various embodiments, the enclosure 102 houses control and power circuitry to convert power from an external source into power suitable to illuminate the light source 108, based on the operating requirements of the light source 108. As such, in various embodiments, the enclosure 102 houses transformers, power supplies, batteries or supercapacitors, LED driver and control circuitry, photocells, motion sensors, timers, and transceivers for wireless or RF communication, among other elements, for providing power and control signals to illuminate the light source (or sources) 108. Generally, the lighting fixtures 100, 110, and 120 are connected to an external power source such as a power utility grid or other power distribution system.

Although the bulk of the additional discussion below is provided with reference to the lighting fixture 100, it should be appreciated that the features described below may be attributed or incorporated into various embodiments of the lighting fixtures 110 and 120, as would be understood by one having ordinary skill in the art.

Figure 2A:
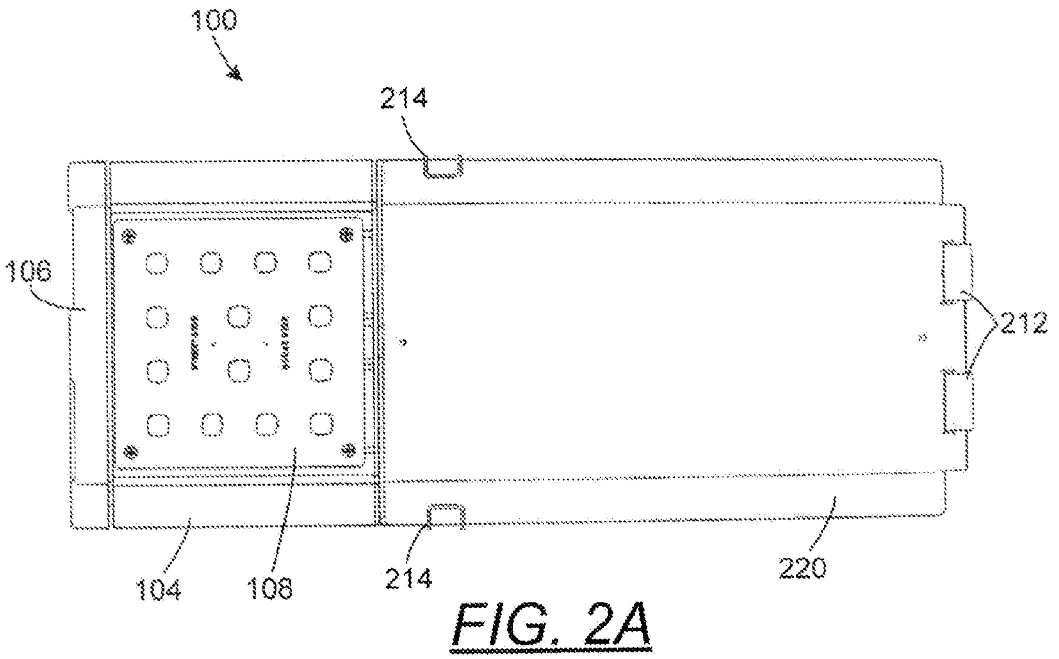
FIG. 2A provides a plan view of an outdoor lighting fixture in accordance with certain example embodiments.
Figure 2B:
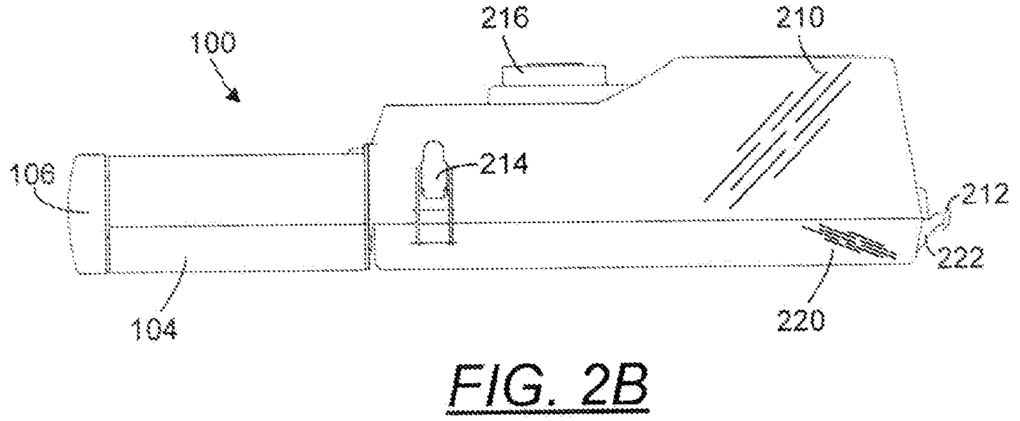
FIG. 2B provides a side view of the outdoor lighting fixture of FIG. 2A in accordance with certain example embodiments.

FIG. 2A provides a plan view of the lighting fixture 100 in accordance with one example embodiment, and FIG. 2B provides a side view of the lighting fixture of FIG. 2A in accordance with one example embodiment. Referring between FIGS. 2A and 2B, the enclosure 102 includes cabinet 210 and cover 220 portions, as illustrated. Securing clips 214 are mounted or otherwise affixed to the cabinet 210 using screws, bolts, clips, tabs, adhesives, or other suitable mechanical fastening means. The securing clips 214 secure the cover 220 to the cabinet 210. In one example embodiment, the securing clips 214 are mounted on two opposing sides of the cabinet 210. The securing clips 214, in various embodiments, include hinge clips or other similar attachment means to securely hold the cover 220 physically adjacent to and against the cabinet 210, together, forming the enclosure 102. In various embodiments, the securing clips 214 are made of stainless steel or other suitable material for the application.

The cabinet 210 further includes a cover-attachment feature 212. In one example embodiment, the cover-attachment feature 212 includes a hinge barrel or a partial hinge barrel, although other attachment features are within the scope and spirit of this disclosure. In the example embodiment illustrated in FIGS. 2A and 2B, the cover-attachment feature 212 includes a partial hinge barrel. The cover 220 includes an attachment feature 222 formed and adapted to mechanically interface (i.e., mate) with the cover-attachment feature 212 such that, in cooperation with the securing clips 214, the cover 220 is securely held adjacent to and against the cabinet 210. When the cabinet 210 and the cover 220 are secured together using the cover-attachment feature 212, the attachment feature 222, and the securing clips 214, the enclosure 102 maintains a water tight seal against the environment for housing the power and control circuitry described above.

As illustrated in FIG. 2B, a light sensor 216 is mounted to the cabinet 210. The lighting fixture 100 is generally installed such that the light sensor 216 is positioned with a view or partial view toward the sky. The light sensor 216 detects daylight and, based on the daylight, provides one or more control signals used to determine whether to turn the light source 108 of the fixture 100 on or off. For example, when the light sensor 216 detects a sufficient or predetermined amount of daylight, it provides a control signal to turn the light source 108 off. Alternatively, when the light sensor 216 detects an insufficient amount of daylight for visibility, for example, it provides a control signal to turn the light source 108 on.

Figure 3:
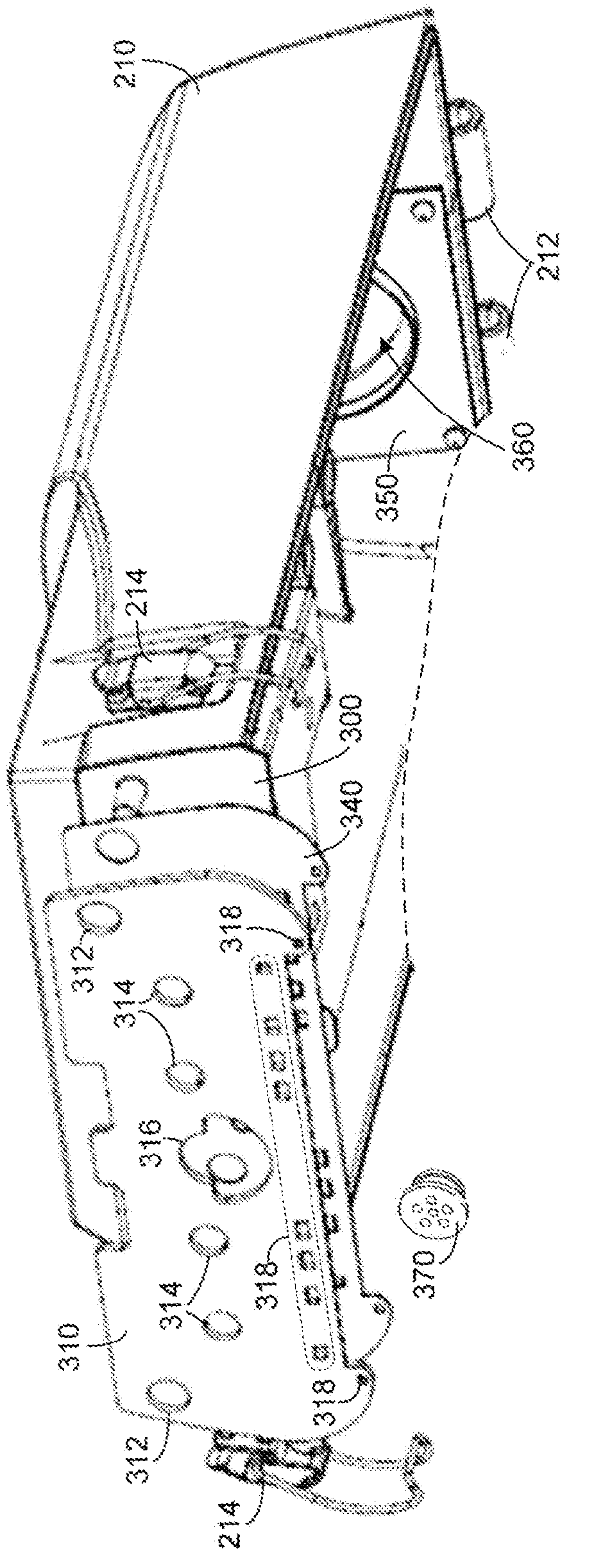
FIG. 3 provides a perspective view of a cabinet of the outdoor lighting fixture of FIGS. 2A-B in accordance with certain example embodiments.

FIG. 3 provides a perspective view of the cabinet 210 of the lighting fixture 100 in accordance with one example embodiment. In FIG. 3, a partial view of an attachment face 300 of the cabinet 210 is illustrated. A gasket 310 and a partial view of a gasket plate 340 are also illustrated. In certain example embodiments, the extruded heatsink 104 of the fixture 100 is attached at one end to the attachment face 300 of the cabinet 210, with the gasket 310 and gasket plate 340 disposed between one end of the extruded heatsink 104 and the attachment face 300. As illustrated in FIG. 3, the cabinet 210 includes a mounting feature 350 having a mounting through-hole 360 at another end. Wiring for supplying power to the lighting fixture 100 can pass through the mounting through-hole 360. In general, the mounting feature 350 and mounting through-hole 360 may take any shape or form suitable for the installation of the lighting fixture 100. FIG. 3 also illustrates a wiring plug 370, which is described in further detail below. In certain example embodiments, the wiring plug 370 is formed from rubber, silicone, or another similar water-tight material.

The gasket 310 includes mounting hole openings 312, through hole openings 314, a wire pass-through opening 316, and multiple drainage openings 318. As the gasket 310 illustrated in FIG. 3 is provided as a representative example embodiment, the gasket 310 may include, in other embodiments, fewer or additional mounting hole openings, through hole openings, wire pass-through openings, or drainage openings. Additionally, the positions of the various openings, mounting holes, and through holes may vary among embodiments based on the design of the fixture 100 and, particularly, the features of the attachment face 300. The gasket plate 340 includes similar openings, mounting holes, and through holes as the gasket 310.

In general, the gasket 310 fills any open space between the extruded heatsink 104 and the gasket plate 340, creating a seal between the extruded heatsink 104 and the gasket plate 340. In various example embodiments, the gasket 310 may be formed from material such as paper, rubber, silicone, metal, cork, felt, neoprene, or rubber, among other materials suitable for the purpose. In certain example embodiments, the gasket 310 is formed from rubber or cork. The gasket plate 340 comprises metal such as aluminum or another rigid or semi-rigid material. As described in further detail below, it is noted that the outline (i.e., shape/size) of the attachment face 300 of the cabinet 210 is smaller than either the gasket 310, the gasket plate 340, or the end face of the extruded heatsink 104 in at least one dimension. Meanwhile, in example embodiments, the size and shape of both the gasket 310 and the gasket plate 340 corresponds to the size and shape of the end face of the extruded heatsink 104. Because the outline of the attachment face 300 is smaller than the outline of the gasket 310 and the end face of the extruded heatsink 104, the gasket plate 340, which is rigid, is relied upon to compress the outer edges of the gasket 310 against the end face of the extruded heatsink 104 when the extruded heatsink 104 is mechanically secured or attached to the attachment face 300 of the cabinet 210.

Referring briefly to FIG. 6, an outline of the gasket 310 and/or the gasket plate 340 in accordance with one example embodiment is illustrated. As noted above, the general outline of the gasket 310 and the gasket plate 340 are the same in one example embodiment. Thus, as shown in FIG. 6, the gasket plate 340 includes mounting hole openings 342, through hole openings 344, a wire pass-through opening 346, and a multitude of drainage openings 348 corresponding, respectively, to the mounting hole openings 312, through hole openings 314, wire pass-through opening 316, and the drainage openings 318 of the gasket 310. As described above, although the gasket 310 and the gasket plate 340 share a generally similar outline, they are formed from different materials, as they serve different purposes. Specifically, the gasket 310 forms a seal between one end of the extruded heatsink 104 and the gasket plate 340, and the gasket plate 340 compresses the outer edges of the gasket 310 against the extruded heatsink 104 when the extruded heatsink 104 is mechanically secured or attached to the attachment face 300 of the cabinet 210. While the gasket 310 and the gasket plate 340 share a generally similar outline, in various embodiments, the gasket plate 340 is generally thicker than the gasket 310. Further, the gasket plate 340 is generally rigid while the gasket 310 is generally flexible, as a consequence of the composition of the material from which each is formed and the application and purpose of each.

Figure 4A:
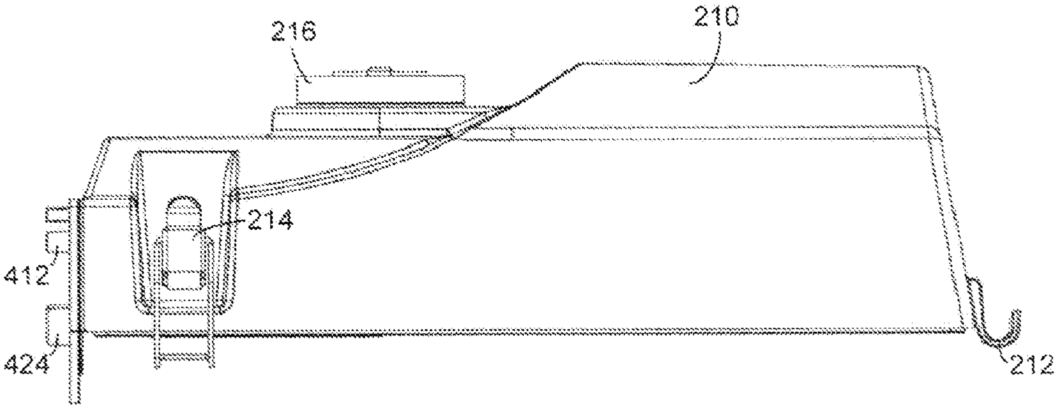
FIG. 4A provides a side view of a cabinet in accordance with certain example embodiments.
Figure 4B:
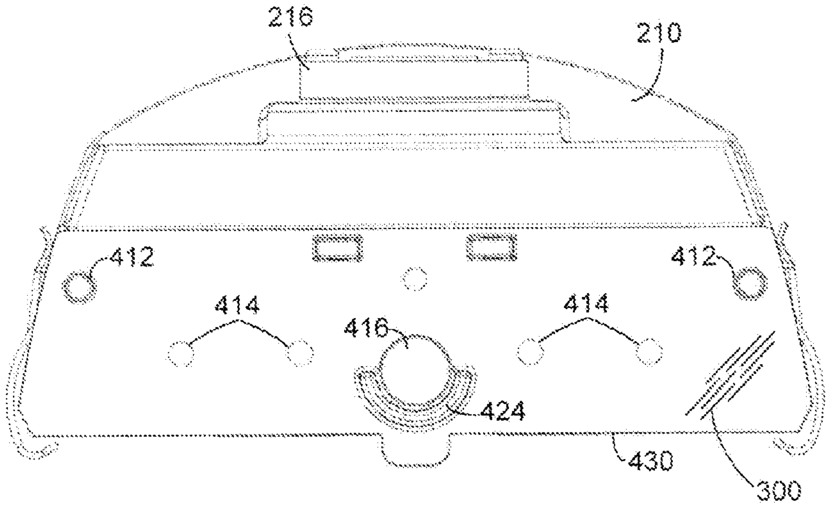
FIG. 4B provides an end view of the cabinet of FIG. 4A in accordance with certain example embodiments.

FIG. 4A provides a side view of the cabinet 210 in accordance with one example embodiment, and FIG. 4B provides an end view of the cabinet 210 in accordance with one example embodiment. Referring between FIGS. 4A and 4B, various features of the cabinet 210 and the attachment face 300 are illustrated. Particularly, the attachment face 300 includes mounting posts 412, through holes 414, a wiring pass-through opening 416, and an annular pass-through lip 424. The positions of the mounting posts 412 of the attachment face 300 correspond to positions of the mounting hole openings 312 of the gasket 310 and the mounting hole openings 342 of the gasket plate 340. In other words, when the lighting fixture 100 is assembled, the mounting posts 412 are inserted into and pass through the mounting hole openings 342 of the gasket plate 340 and the mounting hole openings 312 of the gasket plate 310. As described in further detail below with reference to FIG. 6B, the mounting posts 412 further extend into mounting post eyelets of the extruded heatsink 104, when the fixture 100 is assembled.

The extruded heatsink 104 is mounted or attached to the attachment face 300 of the cabinet 210 using screws, bolts, or other suitable mechanical fastening means that pass through the through holes 414 of the cabinet 210, the through hole openings 344 of the gasket plate 340, and the through hole openings 314 of the gasket 310. In certain example embodiments, the heatsink 104 is mounted or attached to the attachment face 300 of the cabinet 210 using screws having an ISO thread and strength rating suitable for securely attaching the extruded heatsink 104 to the cabinet 210. As described in further detail below with reference to FIG. 6B, the extruded heatsink 104 includes threaded mounting eyelets for mating with the threads of the screws and attaching the extruded heatsink 104 to the cabinet 210.

The wiring plug 370 illustrated in FIG. 3 is inserted into the wiring pass-through opening 416, when the fixture 100 is assembled. As noted above, in example embodiments, the wiring plug 370 is formed from rubber, silicone, or another similar water-tight material. To provide power to the light source 108 while maintaining a seal against the environment, wires for supplying power to the light source 108 are passed through holes in the wiring plug 370. The holes in the wiring plug 370 are sized to permit the wires to pass, while creating a seal against water and other environmental elements. Thus, the wiring plug 370 prevents environmental elements from entering the enclosure 102.

The annular pass-through lip 424 surrounds a portion of the wiring pass-through opening 416. During assembly, the annular pass-through lip 424, in connection with the mounting posts 412, aligns the extruded heatsink 104 to the attachment face 300. In certain embodiments, the annular pass-through lip 424 and/or the mounting posts 412 may be omitted.

Figure 5:
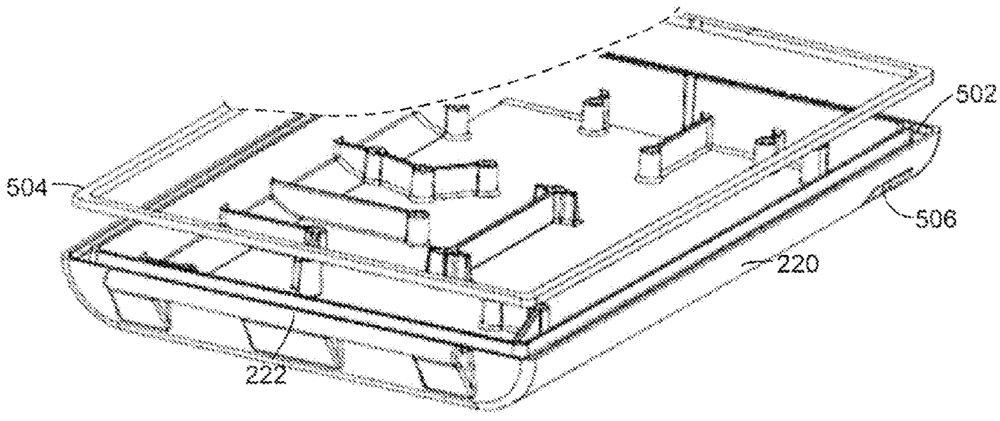
FIG. 5 provides a partial perspective view of a cover in accordance with one example embodiment in accordance with certain example embodiments.

FIG. 5 provides a partial perspective view of the cover 220 of the enclosure 102 in accordance with one example embodiment. The cover 220 includes the attachment feature 222 as discussed above, securing clip recesses 506, and a seal channel 502. As discussed above, when the cabinet 210 and the cover 220 are secured together using the cover-attachment feature 212, the attachment feature 222, and the securing clips 214, the enclosure 102 maintains a water tight seal against the environment as described above. The water tight seal is provided in connection with a rubber seal 504, which is disposed within the seal channel 502 when the cabinet 210 and the cover 220 are secured together. While one securing clip recess 506 is illustrated in FIG. 5, it should be appreciated that another securing clip recess 506 is formed into the cover 220 at a corresponding position on an opposite side of the cover 220. The securing clip recesses 506 are provided at locations on the cover 210 corresponding to the positions of the securing clips 214 of the cabinet 220. The securing clip recesses 506 provide recesses for the securing clips 214 to grip or secure to. The cover 220, in various embodiments, may include eyelets or other structures for mounting power and/or control circuitry within the enclosure 102, as illustrated.

Figure 6A:
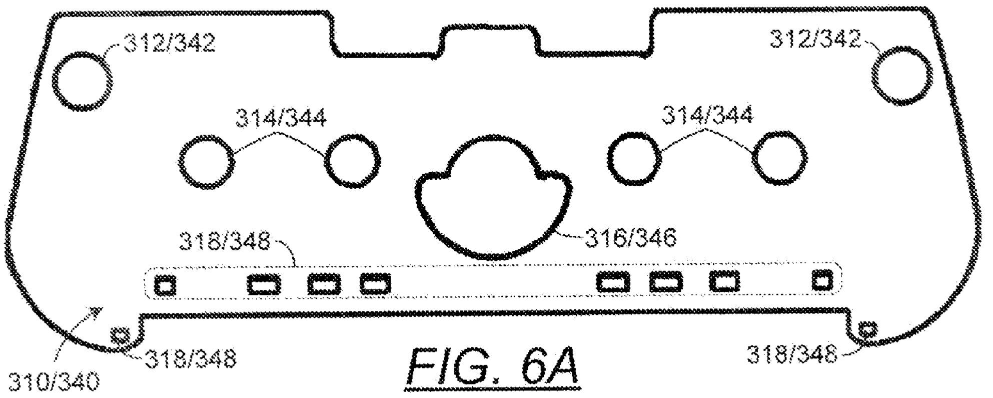
FIG. 6A provides an outline of a gasket and/or gasket plate in accordance with certain example embodiments.
Figure 6B:
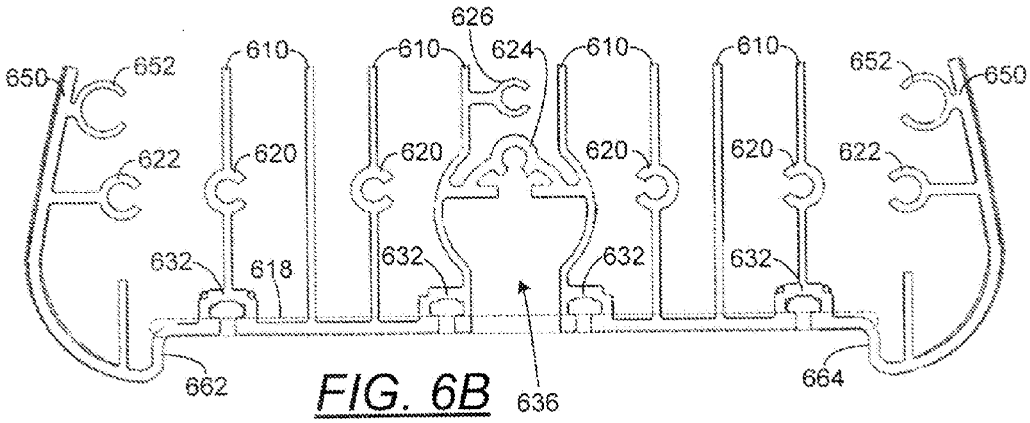
FIG. 6B provides a side view of an extruded heatsink in accordance with certain example embodiments.

FIG. 6B provides a side view of the extruded heatsink 104 in accordance with one example embodiment. The extruded heatsink 104 may be formed from extruded aluminum as understood in the art, for example. In other embodiments, the heatsink 104 may be formed by other suitable processes rather than extrusion, such as casting, and formed from other suitable material rather than aluminum. In the example embodiment of FIG. 6B, the extruded heatsink 104 includes curved sides 650 and a discontinuous plane of material 618 integrally formed with the sides 650. The discontinuous plane of material 618 is integrally formed with the sides 650 by sidewalls 662 and 664, to provide a mounting tray recessed with respect to at least one dimension of the sides 650. The mounting tray is formed in the extruded heatsink 104 to provide a tray for mounting the light source 108. As generally described herein, the mounting tray includes the discontinuous plane of material 618 and is bounded by the sidewalls 662 and 664, which help to prevent light from the light source 108 from spilling over into the sky. Thus, in certain aspects, the mounting tray and the sidewalls 662 and 664 direct light toward roadways and parking lots and away from the sky. It is noted that, in various embodiments, the sides 650 and the sidewalls 662 and 664 can be formed or extruded into alternative shapes than that illustrated in the example embodiment of FIG. 6B.

The extruded heatsink 104 further includes several heat-conducting fins 610 extending from a first side of the plane of material 618. The heat-conducting fins 610 are thermally coupled to and conduct heat away from the light source 108 to maintain the operating lifetime of the light source 108. In various example embodiments, the extruded heatsink 104 may include greater or fewer heat-conducting fins 610 provided at various positions and having various sizes and shapes.

As illustrated, certain ones of the heat-conducting fins 610 include mounting eyelets 620. The mounting eyelets 620 may be threaded in certain embodiments to accept or receive screws having an ISO thread suitable for securely attaching the extruded heatsink 104 to the cabinet 210, as described above. Particularly, the screws may pass through the attachment face 300 of the cabinet 210, through both the gasket plate 340 and the gasket 310, and grip into threads tapped within the mounting eyelets 620. In certain embodiments, the sides 650 include mounting eyelets 622 similar to the mounting eyelets 620. As described above, the mounting posts 412 of the attachment face 300 extend into the mounting post eyelets 652 when the fixture 100 is assembled. The extruded heatsink 104 further includes an end-cap mounting eyelet 624. The end-cap mounting eyelet 624 includes threads in certain embodiments and is used with a screw or other coupling device to secure the end-cap 106 to the end of the extruded heatsink 104 not attached to the attachment face 300 of the cabinet 210. The extruded heatsink 104 may further include a cover mounting eyelet 626 in certain example embodiments. The cover mounting eyelet 626 is provided for mounting a cover over the extruded heatsink 104, which may be desirable to prevent sand or other materials from filling spaces between the heat-conducting fins 610, especially in particularly sandy and windy environments.

In certain example embodiments, the extruded heatsink 104 further includes an elongated center channel 636 and at least one elongated mounting eye opening 632. While the embodiment of the extruded heatsink 104 illustrated in FIG. 6B illustrates four elongated mounting eye openings 632, it is noted that other embodiments may include fewer or additional elongated mounting eye openings 632. It is also noted that the elongated mounting eye openings 632 may be formed in the extruded heatsink 104 at alternative locations to those illustrated in FIG. 6B and that other embodiments may include fewer or additional elongated mounting eye openings 632. In certain example embodiments, the elongated center channel 636 and the elongated mounting eye openings 632 extend from one end of the extruded heatsink 104 to the other. The elongated mounting eye openings 632 are provided for mounting the light source 108 within the mounting tray in connection with threaded eyelet strips, as described in further detail below with reference to FIGS. 8 and 9. The elongated center channel 636 is generally provided as a wiring path or guide for wiring from the enclosure 102 that provides power to the light source 108. In embodiments having multiple light sources 108, several pairs of conductors may be guided within the elongated center channel 636.

Figure 6C:
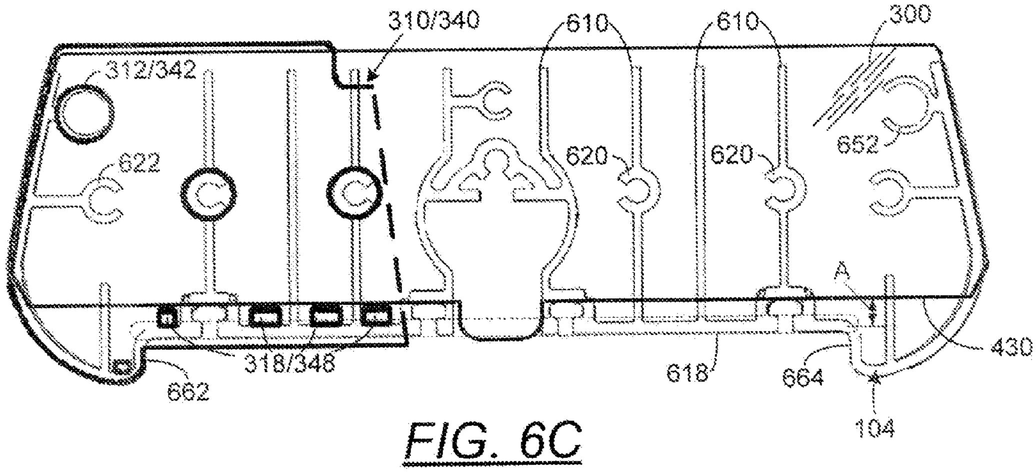
FIG. 6C provides a representative partial cutaway side view of the gasket and/or gasket plate of FIG. 6A, the extruded heatsink of FIG. 6B, and an attachment face of a cabinet in accordance with certain example embodiments.

FIG. 6C provides a representative partial cutaway side view of the gasket 310 and/or the gasket plate 340 of FIG. 6A, the extruded heatsink 104 of FIG. 6B, and the attachment face 300 of the cabinet 210 in accordance with one example embodiment. As illustrated, the mounting hole openings 312/342 and the through hole openings 314/344 of the gasket 310 and/or the gasket plate 340 align with the mounting post eyelets 652 and the mounting eyelets 620 of the extruded heatsink 104, respectively. Additionally, as illustrated in FIG. 6C, the plurality of drainage openings 318/348 are positioned between the heat-conducting fins 610 of the extruded heatsink 104. Particularly, each of the plurality of drainage openings 318/348 is positioned between respective ones of the heat-conducting fins 610.

In connection with the overlay illustrated in FIG. 6C, when the fixture 100 is subject to the environment, any rain that collects or pools between the heat-conducting fins 610 can drain through the drainage openings 318/348. It is noted that a lateral space "A" exists between the bottom edge or surface 430 of the attachment face 300 and the discontinuous plane of material 618. Between this lateral space "A," the plurality of drainage openings 318/348 permit water that collects between the heat-conducting fins 610 to drain. In this manner, water (from rain, for example) does not collect within or between the heat-conducting fins 610, because it flows through the drainage openings 318/348 to the ground. Depending upon the angle at which the lighting fixture 100 is mounted with respect to the ground, water may also drain around the end-cap 106 from the end of the extruded heatsink 104 not attached to the attachment face 300 of the cabinet 210.

Figure 7:
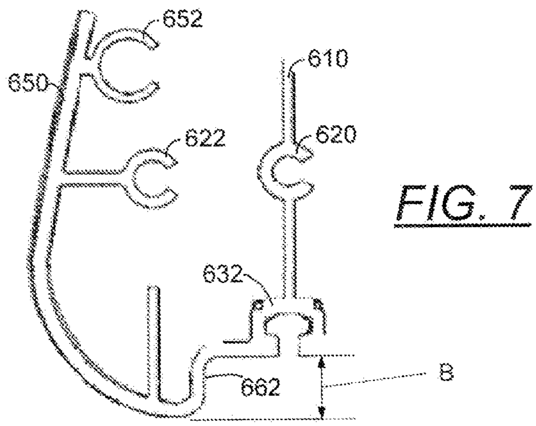
FIG. 7 provides a partial side view of an extruded heatsink including a recessed mounting tray in accordance with certain example embodiments.

With reference to FIG. 6C, it can be appreciated that the extruded heatsink 104 is mounted to the cabinet 210 with the sides 650 and the plane of material 618 being offset below the bottom edge or surface 430 of the attachment face 300. Referring to FIG. 7, which provides a partial side view of the extruded heatsink 104, a total distance or measurement of the offset is the sum of the space "A," measured between the bottom edge 430 of the attachment face 300 and the discontinuous plane of material 618, and the space "B," measured between the discontinuous plane of material 618 and the bottom edge of the sides 650 of the extruded heatsink 104. As identified in FIG. 7, the space "B" corresponds to the depth of the recessed mounting tray and also to the length of the sidewall 662 (and the sidewall 664). In various embodiments, the space "B" may be greater or smaller than the representative embodiment in FIG. 7.

In one aspect, the space "B" of the sidewalls 662 and 664 provides a sufficient mounting tray depth within the extruded heatsink 104 to permit the light source 108 to be recessed into the extruded heatsink 104 when mounted. In this manner, the sidewalls 662 and 664 of the mounting tray reflect light from the light source 108 downward and away from the sky. This aspect of the mounting tray substantially prevents undesirable illumination of the night sky, which interferes with the activities of the airlines, for example, and is generally attributed with waste of the light from the light source 108.

Figure 8:
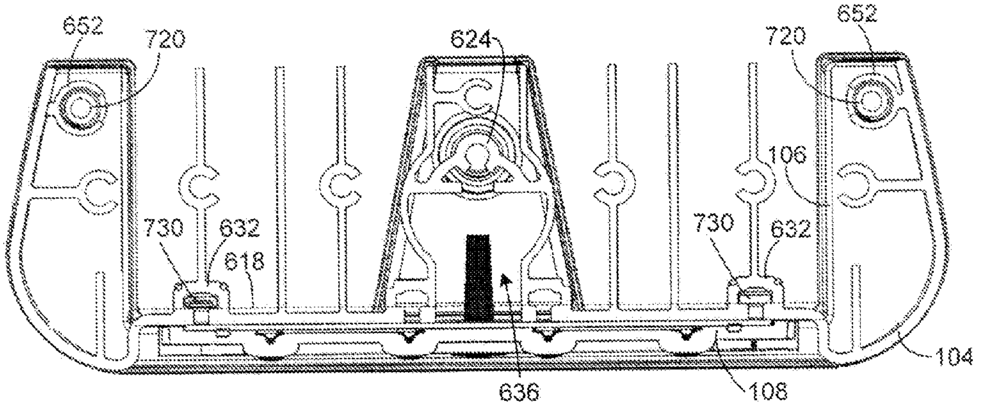
FIG. 8 provides a side view of an extruded heatsink, an end-cap, and a light source in accordance with certain example embodiments.
Figure 9:
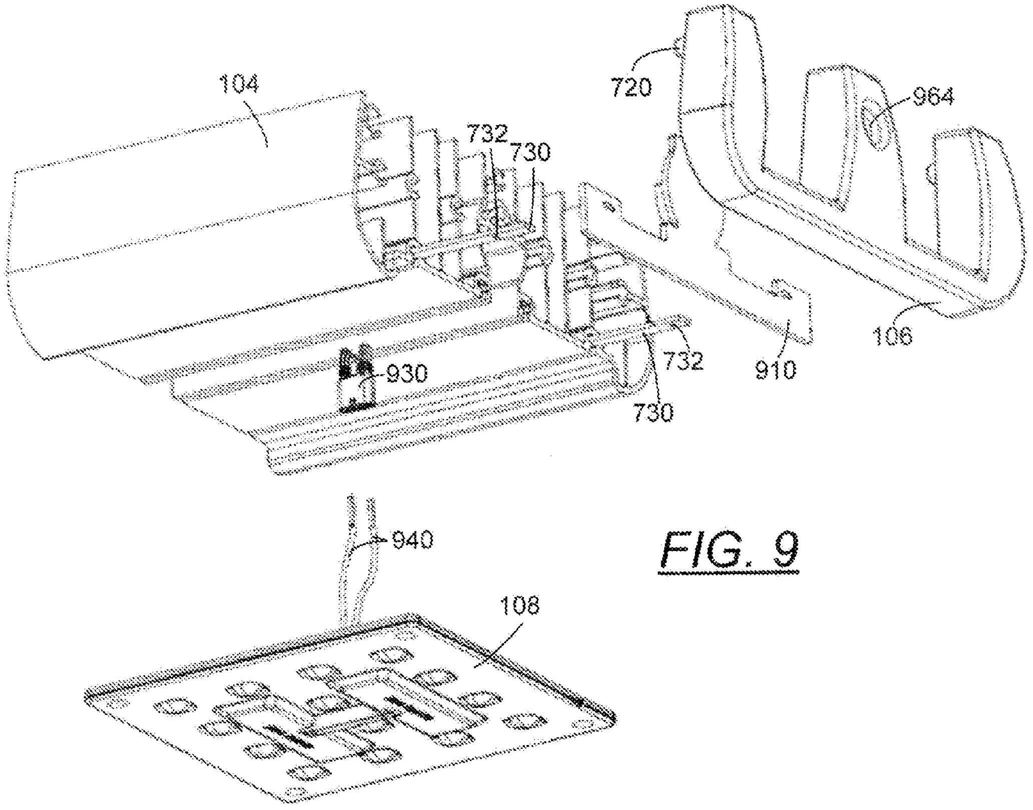
FIG. 9 provides a perspective view of the extruded heatsink, the end-cap, and the light source of FIG. 8 in accordance with certain example embodiments.

FIG. 8 provides a side view of the extruded heatsink 104, the end-cap 106, and the light source 108 in accordance with one example embodiment. In FIG. 8, the light source is mounted to the extruded heatsink in connection with the threaded eyelet strips 730. With reference to FIG. 9, which provides a perspective view of the extruded heatsink 104, the end-cap 106, and the light source 108, insertion of the threaded eyelet strips 730 into the elongated mounting eye openings 632 is illustrated. In example embodiments, the threaded eyelet strips 730 include threaded eyelets 732 tapped at certain positions corresponding to mounting through-holes of the light source 108. Before or after inserting the threaded eyelet strips 730 into the elongated mounting eye openings 632, screws are inserted through the mounting through-holes of the light source 108 and threaded into the threaded eyelets 732 of the threaded eyelet strips 730. Once the threaded eyelet strips 730 are positioned into the elongated mounting eye openings 632 of the extruded heatsink 104, the screws are tightened to secure the light source 108 to the extruded heatsink 104. Particularly, when the screws are tightened, the threaded eyelet strips 730 are securely compressed against the interior walls of the elongated mounting eye openings 632 and the light source 108 is securely compressed against the plane of material 618 forming the recessed mounting tray.

It is noted that, if one or more of the threaded eyelets 732 of the threaded eyelet strips 730 become stripped (i.e., will not catch the threads of a screw), the threaded eyelet strips 730 may be easily replaced. In this context, the use of the threaded eyelet strips 730 provides advantages over tapping threads directly into the extruded heatsink 104. Specifically, it is more difficult to re-tap threads in the extruded heatsink 104 than it is to replace a threaded eyelet strip 730. In certain cases, as would be understood by those having ordinary skill in the art, some stripped threads cannot be re-tapped. In situations such as this, it would be generally necessary to replace the entire extruded heatsink 104. However, the threaded eyelet strips 730 can be replaced, if necessary, without replacing the entire extruded heatsink 104.

Referring still to FIGS. 8 and 9, the end-cap 106 includes mounting posts 720. The mounting posts 720 of the end-cap 106 extend into the mounting post eyelets 652 of the extruded heatsink 104 when the fixture 100 is assembled. When assembled, the end-cap 106 is further secured to the extruded heatsink 104 by a screw that passes through a through hole 964 of the end-cap 106 and into the end-cap mounting eyelet 624 of the extruded heatsink 104. In certain example embodiments, an end-cap plate 910 is inserted between the extruded heatsink 104 and the end-cap 106 when the lighting fixture 100 is assembled.

As discussed above, the elongated center channel 636 is provided as a wiring path or guide for wiring that provides power to the light source 108. In this context, as illustrated in the example embodiment of FIG. 9, wiring leads 940 can be connected to the wiring connector 930 when the lighting fixture 100 is assembled. In certain example embodiments, the wiring connector 930 is electrically coupled to power wires that extend in the elongated center channel 636, through the wiring plug 370, and into the enclosure 102. Within the enclosure, the power wires are electrically coupled to control and/or power circuitry that converts power from an external source into power suitable to illuminate the light source 108.

Figure 10:
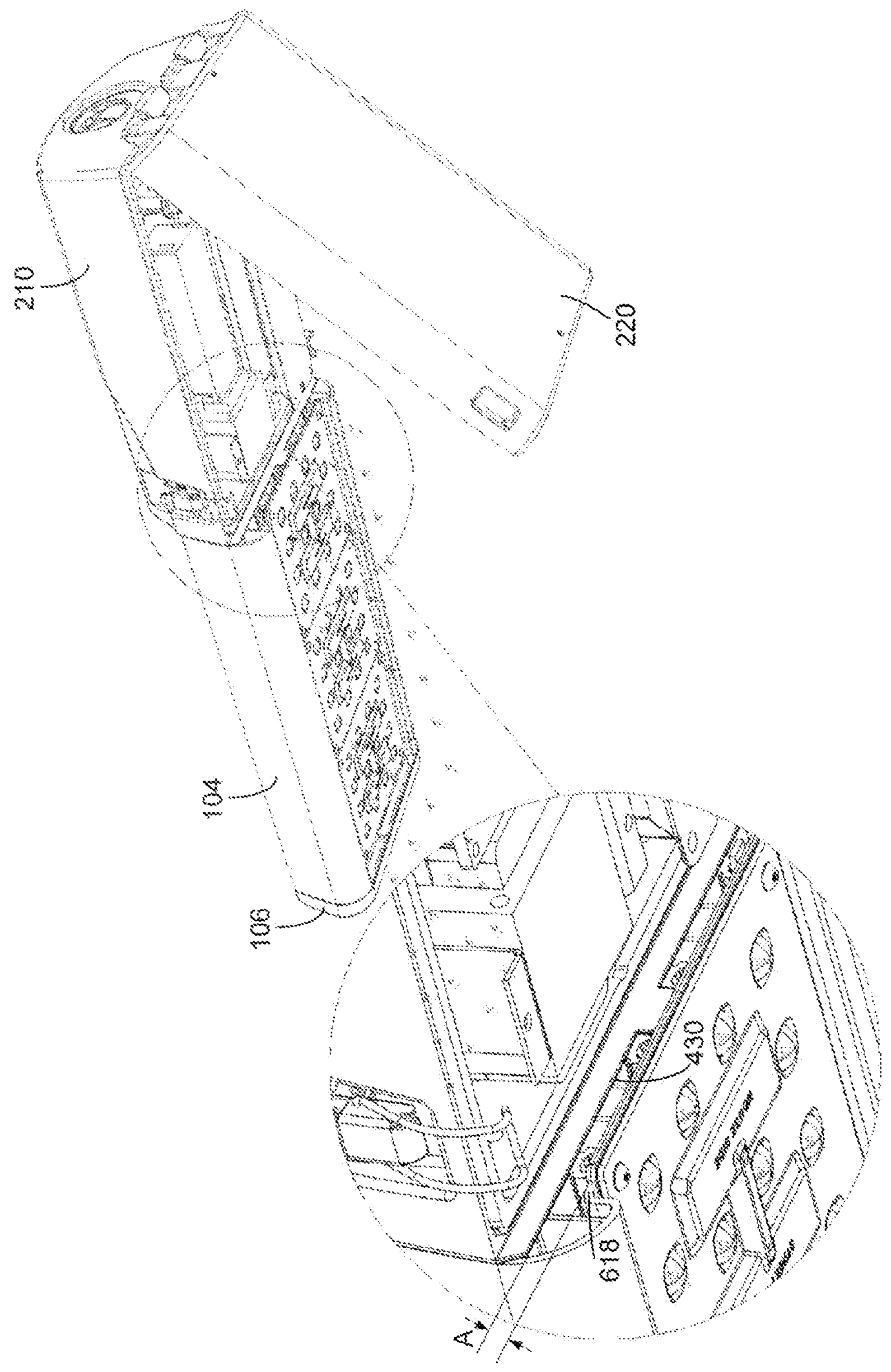
FIG. 10 provides a perspective view of a lateral space provided between an extruded heatsink and a cabinet of an enclosure in accordance with certain example embodiments.

FIG. 10 provides a perspective view of the lateral space "A" provided between the plane of material 618 of the extruded heatsink 104 and the bottom edge 430 of the cabinet 210 in accordance with one example embodiment. In FIG. 10, it is clear that the extruded heatsink 104 is mounted or coupled to the cabinet 210 such that the extruded heatsink 104 is offset from or extends below the bottom edge 430 of the attachment face 300 of the cabinet 210 by the lateral space "A". As noted in the description above, the lateral space "A" permits any water that collects between the heat-conducting fins 610 of the extruded heatsink 104 to drain. Additionally, the lateral space "A" permits air to pass. In other words, the lateral space "A" provides a water and air outlet.

It is noted that, in the embodiment illustrated in FIG. 10, the gasket 310 and the gasket plate 340 are not mounted between the extruded heatsink 104 and the cabinet 210 of the enclosure 102. As described above, however, in certain embodiments, the gasket 310 and the gasket plate 340 are mounted or coupled between the extruded heatsink 104 and the cabinet 210. In this case, the drainage openings 318/348 of the gasket 310 and the gasket plate 340 are positioned within the lateral space "A". As such, water is able to flow through the drainage openings 318/348 of the gasket 310 and the gasket plate 340 to the ground, for example.

Figure 11:
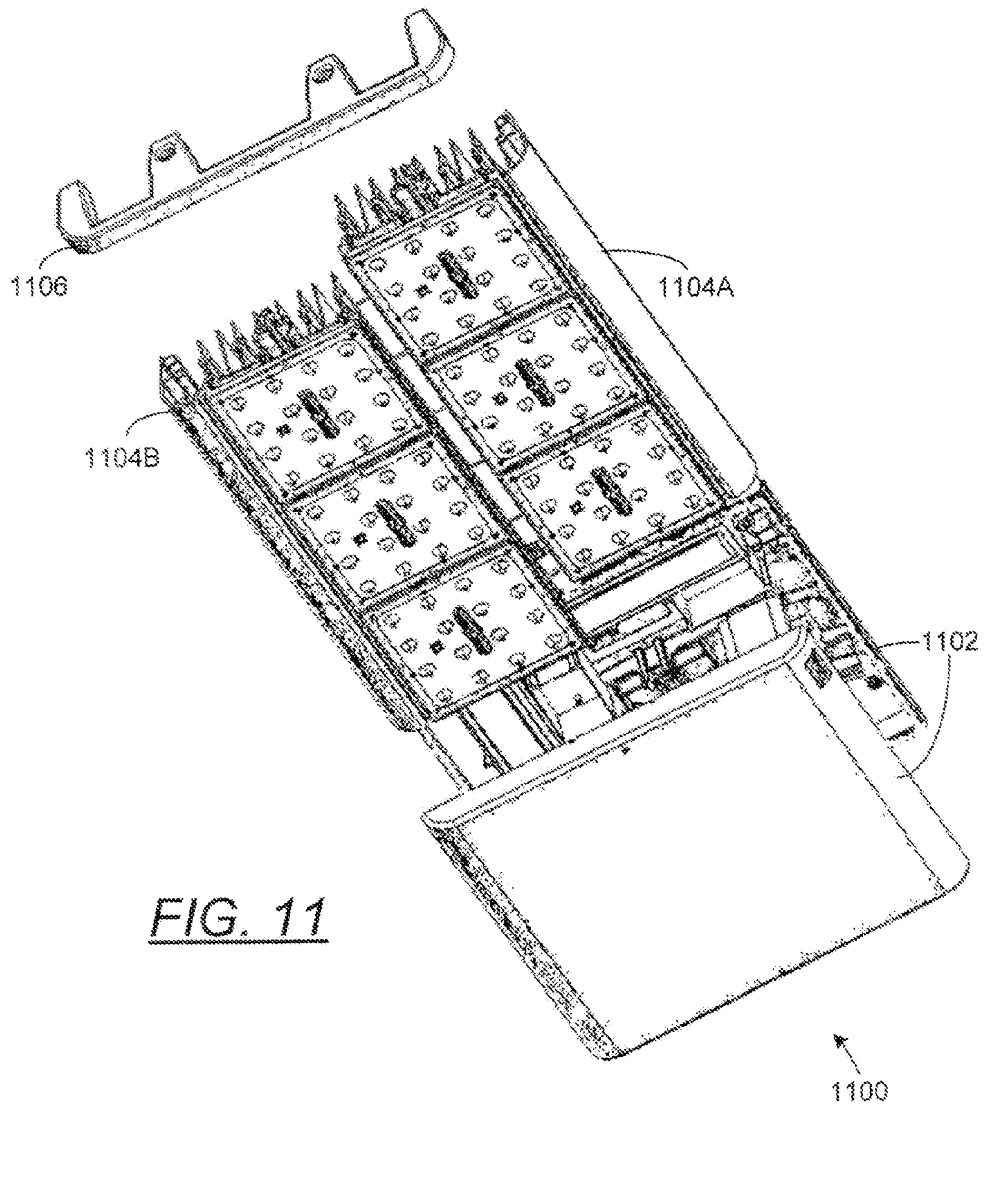
FIG. 11 provides a perspective view of another lighting fixture in accordance with certain example embodiments.

FIG. 11 provides a perspective view of another lighting fixture 1100 in accordance with other example embodiments. In FIG. 11, the lighting fixture 1100 is similar to the lighting fixtures 100, 110, and 120, although it includes two extruded heatsink sections 1104A and 1104B. Additionally, the lighting fixture 1100 includes an enclosure 1102 that is wider than the enclosure 102 of the lighting fixture 100, for example, to accommodate the additional size of the combination of the heatsink sections 1104A and 1104B. The end-cap 1106 is also wider than the end-cap 106 of the lighting fixture 100 to accommodate the additional size of the combination of the heatsink sections 1104A and 1104B. In example embodiments, certain features of the lighting fixtures 100, 110, and 120 described above are incorporated into the lighting fixture 1100, as would be understood by one having ordinary skill in the art.

Figure 12A:
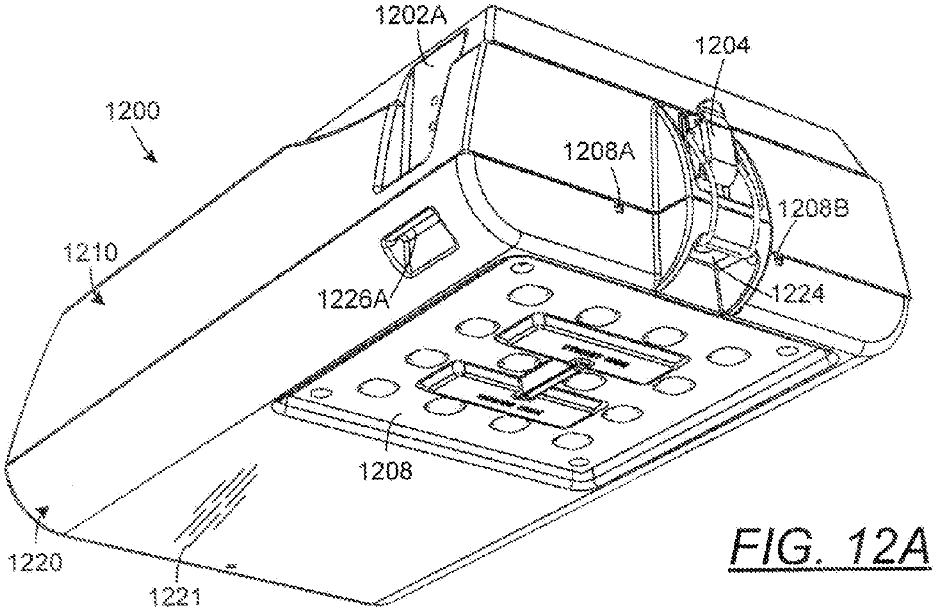
FIG. 12A provides a bottom perspective view of a power door lighting fixture in accordance with certain example embodiments.

Turning to other embodiments of lighting fixtures, FIG. 12A provides a bottom perspective view of a power door lighting fixture 1200 in accordance with an example embodiment. In certain example applications, the lighting fixture 1200 is suitable as an outdoor lighting fixture for illuminating roadways, parking lots, or parking garages, for example, without limitation. The lighting fixture 1200 includes a cabinet 1210 and a cover 1220. Generally, the lighting fixture 1200 encloses various circuit modules for driving a light source 1208, as well as mounting hardware and other elements of the lighting fixture 1200. Within the cabinet 1210 and the cover 1220, an enclosure or enclosed area of the lighting fixture 1200 is defined. The cabinet 1210 and the cover 1220 may be formed from aluminum, steel, or other metals or metal alloys, plastic, or other material suitable for the application.

In FIG. 12A, an exterior surface 1221 of the cabinet 1210 and the cover 1220 is illustrated. The cabinet 1210 includes an attachment clip 1204, and the cover 1220 includes an attachment recess 1224 and channel drains 1208A and 1208B, as described in further detail below. In the embodiment illustrated in FIG. 12A, it is noted that the cover 1220 is secured to the cabinet 1210, at least in part, using the attachment clip 1204 which clips to the attachment recess 1224. Certain embodiments may rely on clips similar to the attachment clip 1204, but fastened to attachment mounts 1202A and 1202B, for example. The holes in the attachment mounts 1202A and 1202B may be relied upon for mounting additional attachment clips (or omitted if no clips are attached). It is noted that, in embodiments in which no clips are mounted to the attachment mounts 1202A and 1202B, the mounts 1202A and 1202B may be omitted. The cover 1220 further includes attachment recesses 1226A and 1226B (see also FIG. 17) as mating recesses for attachment clips mounted to the attachment mounts 1202A and 1202B. For attachment clips fastened to the attachment mounts 1202A and 1202B, the clips may secure the cover 1220 to the cabinet 1210 by clipping to the attachment recesses 1226A and 1226B. In embodiments in which no clips are mounted to the attachment mounts 1202A and 1202B, the attachment recesses 1226A and 1226B may also be omitted. Other features for securing the cover 1220 to the cabinet 1210 are described in further detail below.

As illustrated, the light source 1208 is coupled, mounted, or affixed to the exterior surface 1221 of the cover 1220. In various embodiments, the light source 1208 is coupled to the cover 1220 using screws, bolts, clips, tabs, adhesives, or other suitable mechanical fastening means. In certain embodiments, the cover 1220 is in thermal contact or communication with the light source 1208, to disperse heat emitted from the light source 1208. The cover 1220 may disperse the heat by conduction and/or convection, for example, to maintain an operating lifetime of the light source 1208. In various embodiments, the lighting fixture 1200 encloses control and power circuitry to convert power from a power source into power suitable to illuminate the light source 1208, based on the operating requirements of the light source 1208. As such, the lighting fixture 1200 may enclose transformers, power supplies, batteries or supercapacitors, LED driver and control circuitry, photocells, motion sensors, timers, and transceivers for wireless or RF communications, among other elements. Generally, the lighting fixture 1200 is connected to an external power source such as a power utility grid or other power distribution system.

In certain embodiments of the light fixture 1200, the light source 1208 is similar to the light source 108 described above and includes a plurality of light emitting diodes (LEDs) mounted to a square substrate. Each of the LEDs includes semi-conductive material that is treated to create a positive-negative (p-n) junction. When the LEDs are electrically coupled to a power source, such as an LED driver, current flows through the junction, causing charge carriers to release energy in the form of incoherent light. In alternative embodiments, the light source 1208 may include light sources other than LEDs, such as organic light emitting diodes (OLEDs), incandescent or miniature incandescent bulbs, compact florescent lights (CFLs), or other known light sources or combinations thereof.

Figure 12B:
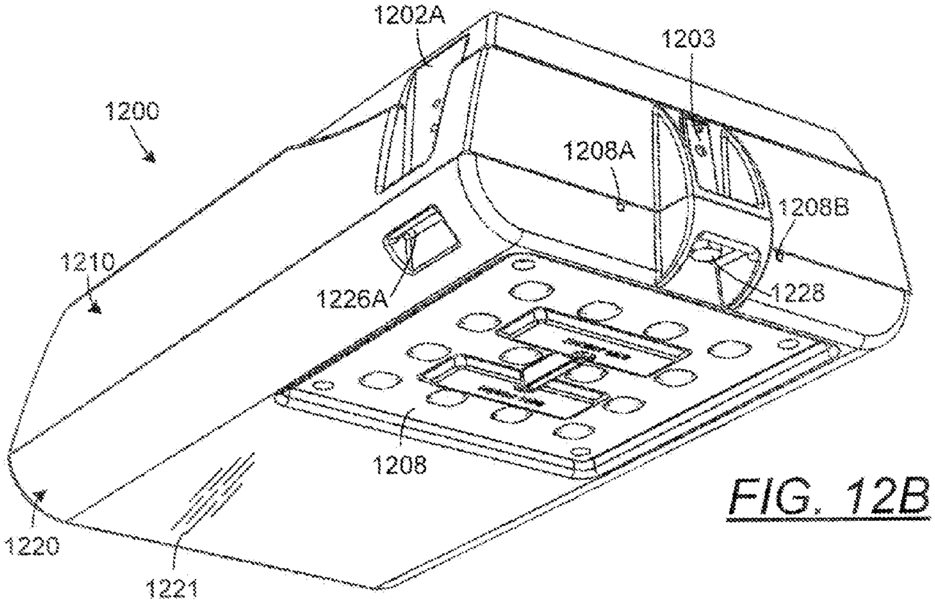
FIG. 12B provides a bottom perspective view of a power door outdoor lighting fixture in accordance with certain example embodiments.

FIG. 12B provides a bottom perspective view of the power door lighting fixture 1200. In FIG. 12B, the cabinet 1210 and the cover 1220 of the lighting fixture 1200 are secured together with attachment hardware 1228. Rather than the attachment clip 1204 used in FIG. 12A, the attachment hardware 1228 secures the cover 1220 to the cabinet 1210 in the embodiment illustrated in FIG. 12B. In various embodiments, the attachment hardware 1228 may include a bolt, a screw, or other similar hardware, and the cabinet 1210 may include a threaded hole or eyelet corresponding to a thread of the attachment hardware 1228. As the attachment clip 1204 is omitted from the embodiment illustrated in FIG. 12B, an additional attachment mount 1203 is illustrated. In embodiments, where the attachment clip 1204 is omitted, the attachment mount 1203 (i.e., the mounting holes and any related supports) may also be omitted.

Figure 13:
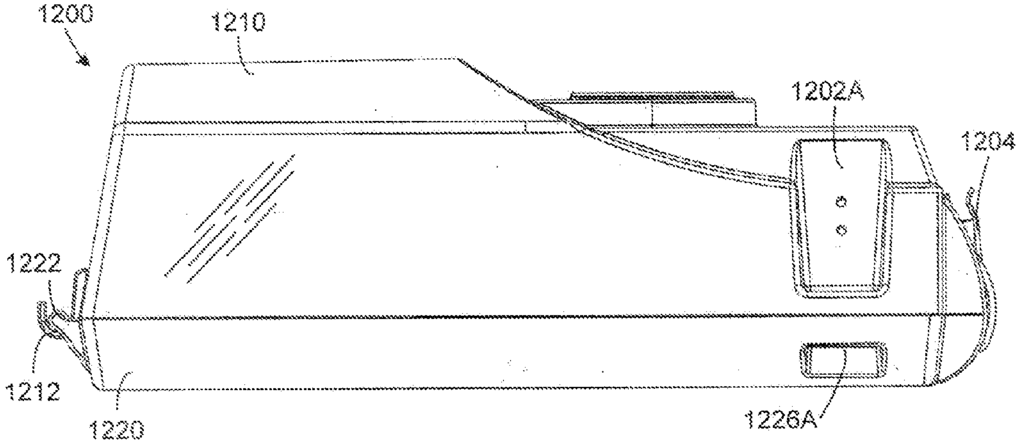
FIG. 13 provides a side view of the power door lighting fixture of FIG. 12A in accordance with certain example embodiments.
Figure 14:
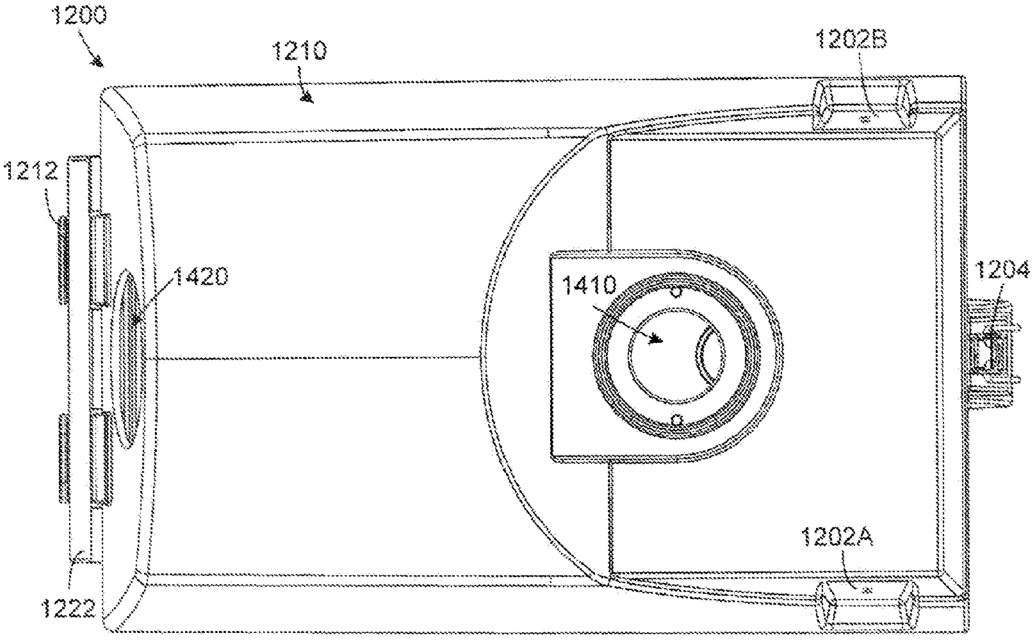
FIG. 14 provides a top view of the power door lighting fixture of FIG. 12A in accordance with certain example embodiments.

FIG. 13 provides a side view and FIG. 14 provides a top view of the power door lighting fixture 1200. In FIG. 13, additional features of the cover 1220, such as the attachment feature 1222, are illustrated. As best illustrated in FIG. 14, the attachment feature 1222 comprises, in one embodiment, an attachment rod. As also illustrated in FIGS. 13 and 14, the cabinet 1210 further includes an attachment feature 1212, such as an attachment hook. Using the attachment rod 1222 and the attachment hook 1212, the cover 1220 may be easily positioned with and secured to the cabinet 1210 as described in further detail below. As would be clear to those having ordinary skill in the art, the attachment rod 1222 and the attachment hook 1212 secure the cabinet 1210 and the cover 1220 at one end of the lighting fixture 1200 and the attachment clip 1204 secures the cabinet 1210 and the cover 1220 at another end of the lighting fixture 1200. It is noted, however, that the attachment rod 1222 and the attachment hook 1212 are illustrated by way of example only and, in various embodiments, alternative means of securing the cover 1220 to the cabinet 1210 are within the scope and spirit of the embodiments described herein. Similarly, the cover 1220 may be secured to the cabinet 1210 using an attachment means other than the attachment clip 1204 or the attachment hardware 1228. For example, attachment clips similar to the attachment clip 1204 may be mounted to the attachment mounts 1202A and 1202B, and those clips may be used to secure the cover 1220 to the cabinet 1210 by clipping or mechanically grabbing the attachment recesses 1226A and 1226B.

The mounting through-hole 1420 of the cabinet 1210 is also illustrated in FIG. 14. The mounting through-hole 1420 is provided to permit the lighting fixture 1200 to be mounted to a pole or other supporting means, for example, as described in further detail below with reference to FIG. 21. When installing the lighting fixture 1200, the cabinet 1210 can be installed to a mounting pole or other suitable supporting means by passing the mounting pole through the mounting through-hole 1420 and securing the cabinet 1210 using mounting hardware mechanically attached or mounted to the cabinet 1210. Once the cabinet 1210 is secured to the mounting pole or other attachment point, the cover 1220 may be positioned so that the attachment rod 1222 of the cover 1220 hangs from the attachment hook 1212 of the cabinet 1210 while electrical connections are made between circuit modules mounted to the cover 1220 and an electrical connection of the lighting fixture 1200. After the electrical connection is made, the installation of the lighting fixture 1200 may be completed by swinging the cover 1220 into a closed position with respect to the cabinet 1210, and securing the cover 1220 to the cabinet 1210 using the attachment clip 1204 or the attachment hardware 1228, for example.

In FIG. 14, additional features of the cabinet 1210, such as the through-hole 1410, are illustrated. Using the through-hole 1410, one or more sensors, such as daylight or sunlight sensors, for example, may be mounted to the cabinet 1210 and pass from an exterior of the cabinet 1210 to an area enclosed within the lighting fixture 1200. On the basis of such a sensor, power may be controlled to the light source 1208 so as to provide illumination only when ambient light is low, in certain aspects. The through-hole 1410 may be omitted in certain embodiments, for example, if no sensors are relied upon for daylight sensing.

As described in further detail below, the cover 1220 of the lighting fixture 1200 comprises a power door. In other words, all or substantially all electrical circuitry or circuit modules necessary for providing power to the light source 1208 are mounted to the cover 1220. Because the light source 1208 and the electrical circuitry required for providing power to the light source 1208 are mounted to the cover 1220, the lighting fixture 1200 may be quickly and easily upgraded with new light sources as they become available. That is, after the cabinet 1210 is securely mounted, new covers having a form factor similar to the cover 1220 may be secured to the cabinet 1210 to replace a light source of the lighting fixture 1200. When replacing the light source 1208 with a new light source, the cover 1220 can be easily removed and replaced with a new cover having a new light source. Just as the electrical circuit modules for the light source 1208 are mounted to the cover 1210, the electrical circuitry for providing power to the new light source may be mounted to the new cover, and the lighting fixture 1200 can be quickly and easily retrofitted to incorporate new light sources as they become available.

Figure 15:
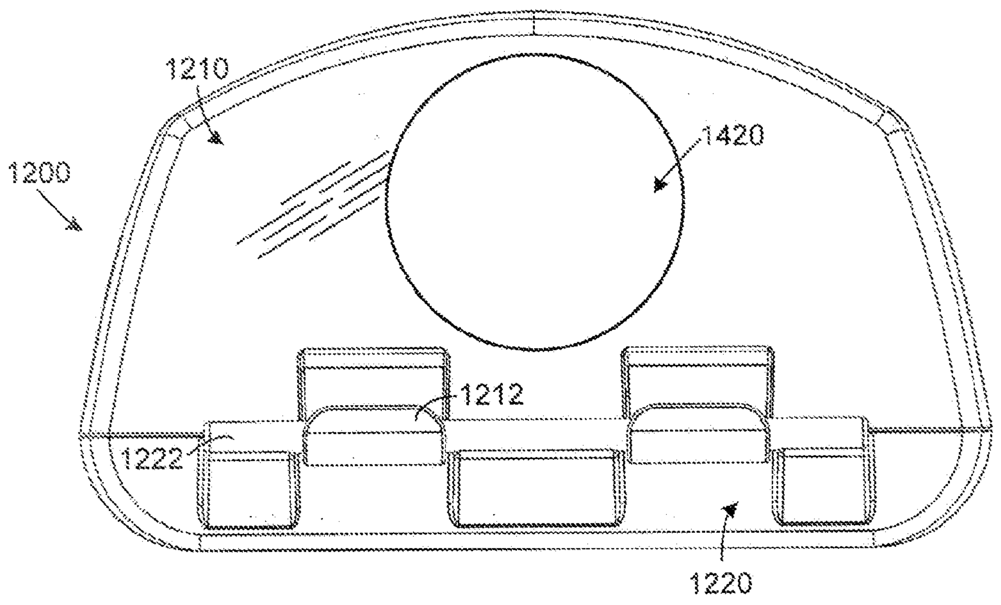
FIG. 15 provides a back view of the power door lighting fixture of FIG. 12A in accordance with certain example embodiments.
Figure 16:
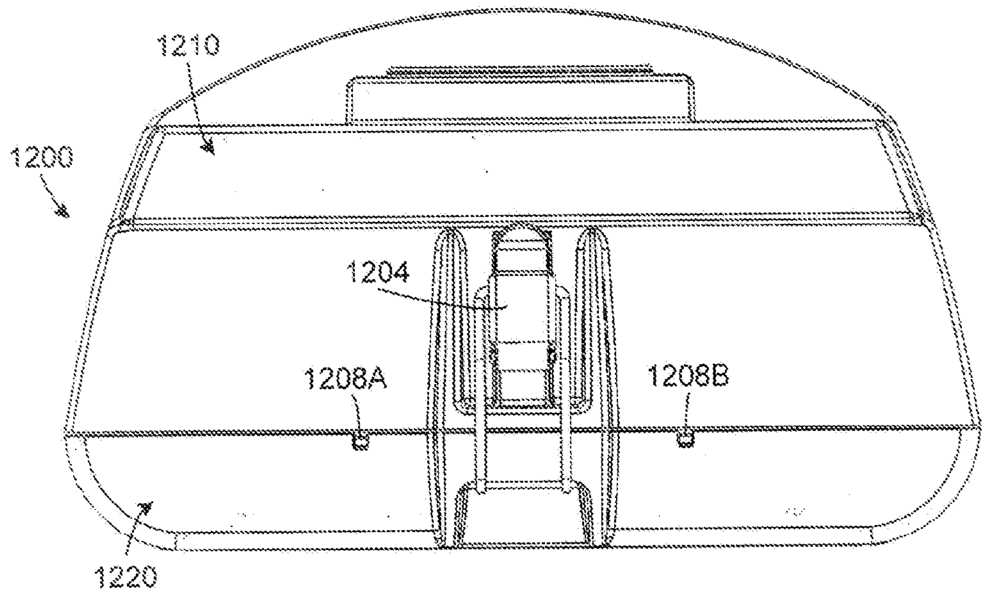
FIG. 16 provides a front view of the power door lighting fixture of FIG. 12A in accordance with certain example embodiments.

FIG. 15 provides a back view and FIG. 16 provides a front view of the power door lighting fixture 1200. In FIG. 15, the mounting through-hole 1420, the attachment hook 1212, and the attachment rod 1222 are clearly illustrated. In FIG. 16, the attachment clip 1204 and the mating channel drains 1208A and 1208B are also clearly illustrated.

Figure 17A:
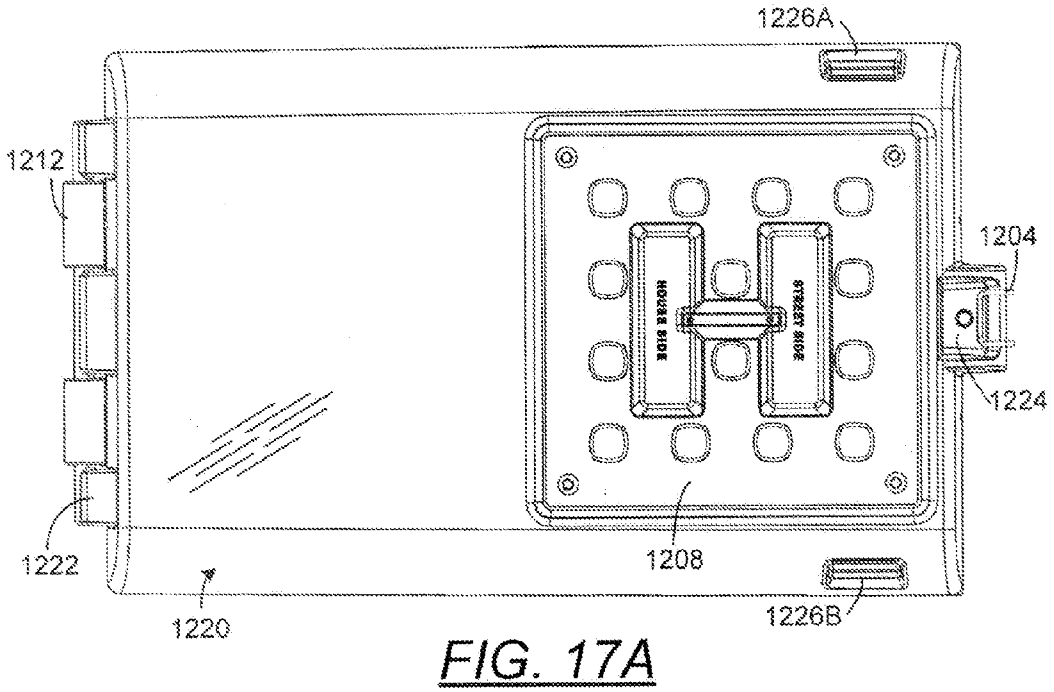
FIG. 17A provides a bottom exterior view of a cover of the power door lighting fixture of FIG. 12A in accordance with certain example embodiments.

FIG. 17A provides a bottom exterior view of the cover 1220 of the power door lighting fixture 1200. In FIG. 17A, both the attachment recesses 1226A and 1226B and the attachment recess 1224 are clearly illustrated.

Figure 17B:
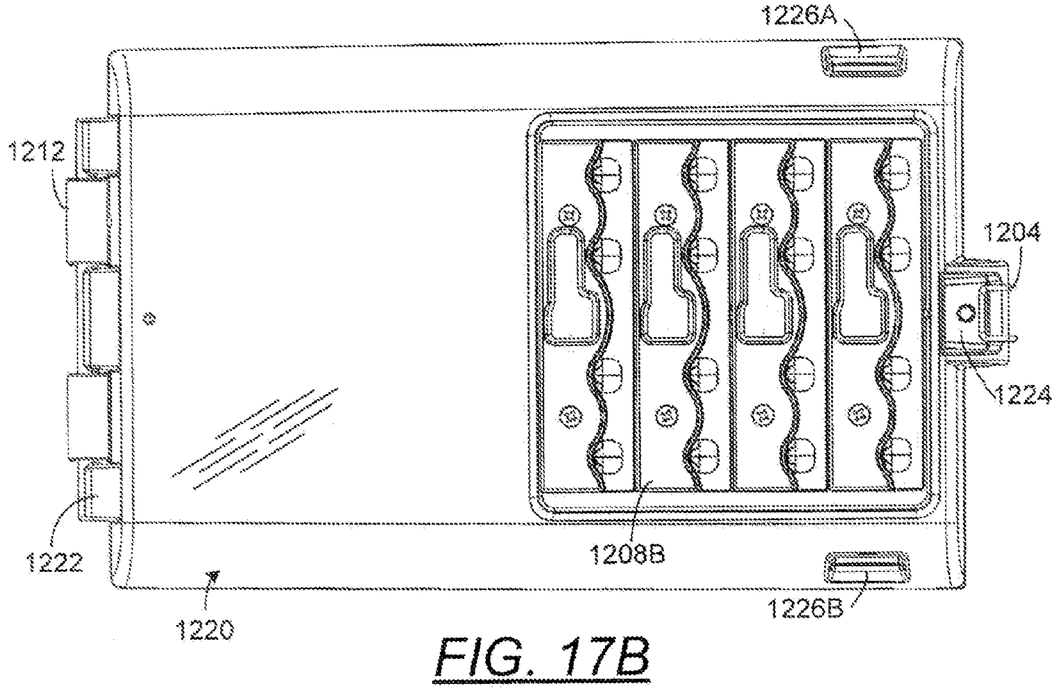
FIG. 17B provides a bottom exterior view of a cover of the power door lighting fixture of FIG. 12A in accordance with certain example embodiments.

FIG. 17B provides a bottom exterior view of the cover 1220 with an alternative light source 1208B. In one embodiment, the alternative light source 1208B also includes a plurality of LEDs mounted to a square substrate. However, the LEDs of the light source 1208B may vary in operating parameters as compared to the LEDs of the light source 1208. That is, the LEDs of the light source 1208B may vary in input voltage and current, for example, as compared to the LEDs of the light source 1208. Alternatively or additionally, the LEDs of the light source 1208B may vary in light output intensity, light output direction, and light output color as compared to the LEDs of the light source 1208, among other variances. It is noted that the light source 1208B may be better suited for certain applications as compared to the light source 1208. That is, by way of example and not limitation, the light source 1208B may be better suited as a roadway light and the light source 1208 may be better suited as a parking lot light. As another example, the light source 1208B may be better suited for low power operation and the light source 1208 may be better suited for high intensity light output applications. For both the light source 1208 and the light source 1208B, all or substantially all electrical circuitry for providing power to the light source 1208B may be mounted to a cover similar to the cover 1220. Thus, according to certain aspects described herein, replacement of the light source 1208 with the light source 1208B can be accomplished by replacement of a cover of the lighting fixture 1200.

Figure 17C:
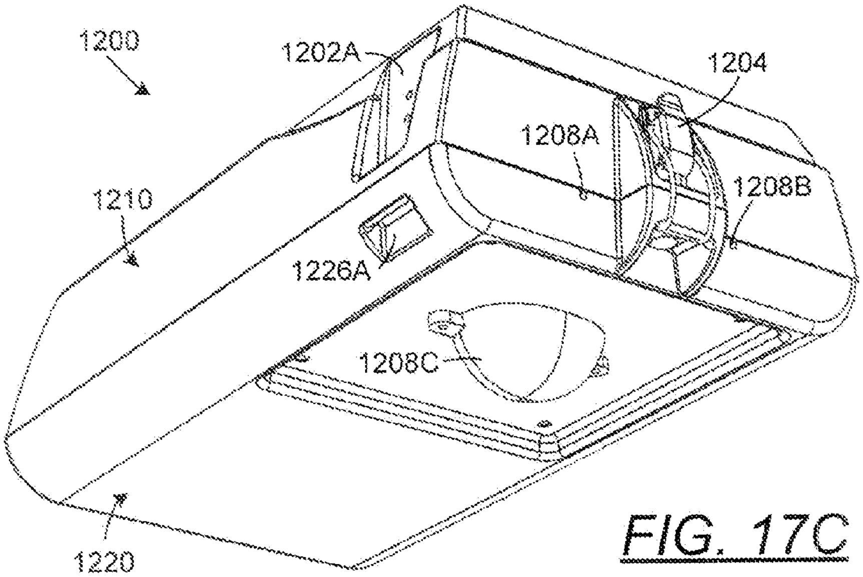
FIG. 17C provides a bottom perspective view of a power door lighting fixture in accordance with certain example embodiments.
Figure 17D:
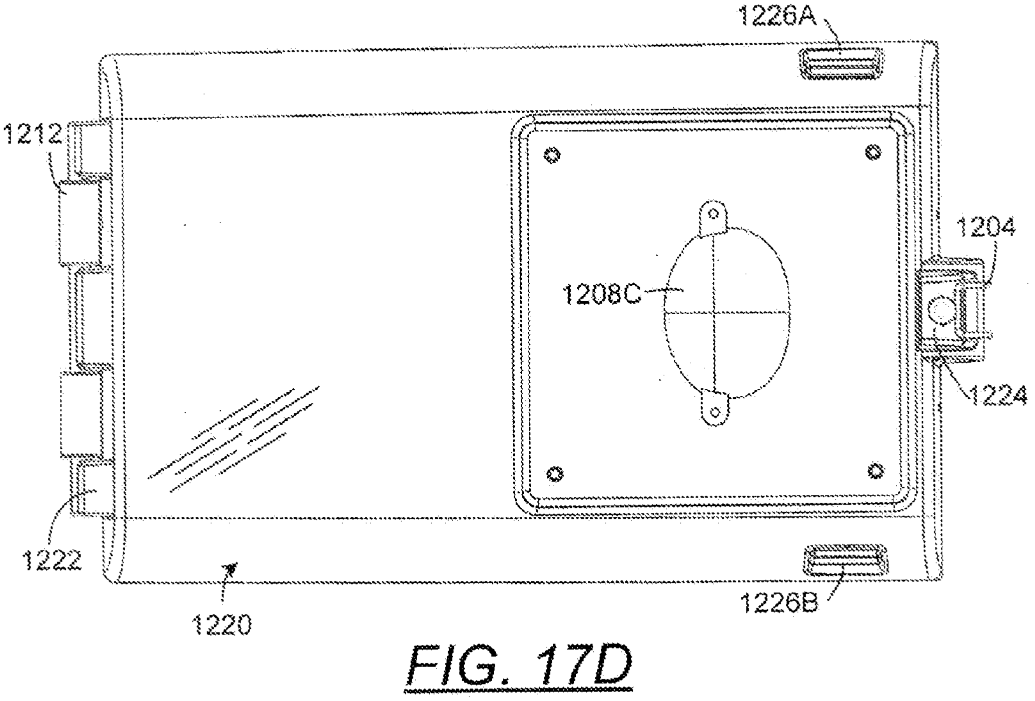
FIG. 17D provides a bottom exterior view of a cover of the power door lighting fixture of FIG. 17C in accordance with certain example embodiments.

FIG. 17C provides a perspective view and FIG. 17D provides a bottom view of the lighting fixture 1200 with another light source 1208C. In one embodiment, the light source 1208C also includes one or more LEDs, such as a "chip-on-board" LED, integrated with a diffusing and/or distributing blob or globe optic. In other embodiments, the light source 1208C includes light sources other than LEDs, such as organic light emitting diodes (OLEDs), incandescent or miniature incandescent bulbs, compact florescent lights (CFLs), or other known light sources or combinations thereof. Again, the light source 1208C may vary in operating parameters as compared to the light sources 1208 and 1208B. That is, the light source 1208C may vary in input voltage and current specifications, for example, as compared to the LEDs of the light sources 1208 and 1208B. Alternatively or additionally, the light source 1208C may vary in light output intensity, light output direction, and light output color as compared to the light sources 1208 and 1208B.

Figure 18:
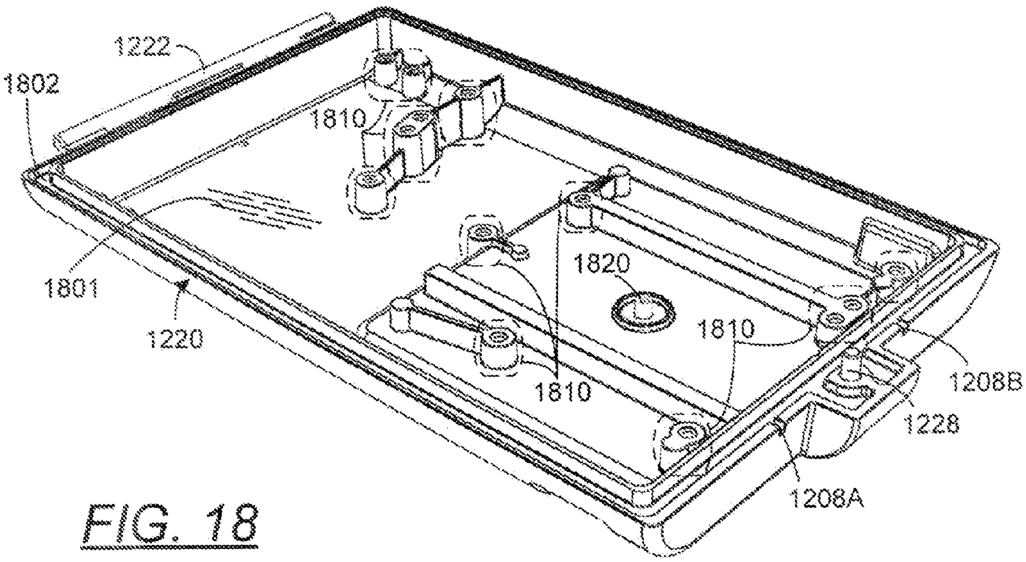
FIG. 18 provides a top interior view of a cover of a power door lighting fixture in accordance with certain example embodiments.

FIG. 18 provides a top interior view of the cover 1220 of the power door lighting fixture 1200 in accordance with one example embodiment. FIG. 18 illustrates an interior surface 1801 of the cover 1220. A mating channel 1802 of the cover 1220 is also illustrated. In one embodiment, the mating channel 1802 extends about an entire circumference of the cover 1220 and is provided to capture water, dust, or debris, for example, that may become trapped between the cabinet 1210 and the cover 1220. In certain embodiments, a seal or gasket formed from material such as paper, rubber, silicone, metal, cork, felt, neoprene, or rubber, among other materials suitable for the purpose, may be seated within the mating channel 1802 when the lighting fixture 1200 is assembled. As illustrated in FIG. 18, the mating channel drains 1208A and 1208B are provided to permit water, for example, that accumulates within the mating channel 1802 to drain out from the channel. It is noted that the mating channel drains 1208A and 1208B may be positioned at alternative positions about the circumference of the cover 1220 in various embodiments. Additionally, in various embodiments, the lighting fixture 1200 may include greater or fewer mating channel drains.

FIG. 18 also illustrates mounts, mount points, or mounting pillars 1810 that extend upward and outward from the interior surface of the cover 1220. The mount points 1810 are provided on the cover 1220 so that electrical circuitry, as further illustrated in FIG. 19, can be mounted to the cover 1220. One or more of the mount points 1810 may include a threaded hole to accept a screw passed through a mounting eyelet of a circuit module, for example, to be secured to the cover 1220. In certain example embodiments, all or substantially all of the electrical circuitry for providing power to the light source 1208 is mounted to the cover 1220 using the mount points 1810. In other embodiments, the mount points 1810 may include flexible snap-type points or tips, and electrical circuitry or circuit modules may be mounted to the cover 1220 by snapping eyelets of the circuit modules to the snap-type points.

A wiring conduit 1820 is also illustrated in FIG. 18. The wiring conduit 1820 is provided to permit an electrical coupling, such as one or more wires, to pass from an enclosed interior space of the lighting fixture 1200 to a space exterior to the lighting fixture 1200, so that power may be provided to the light source 1208.

Figure 19:
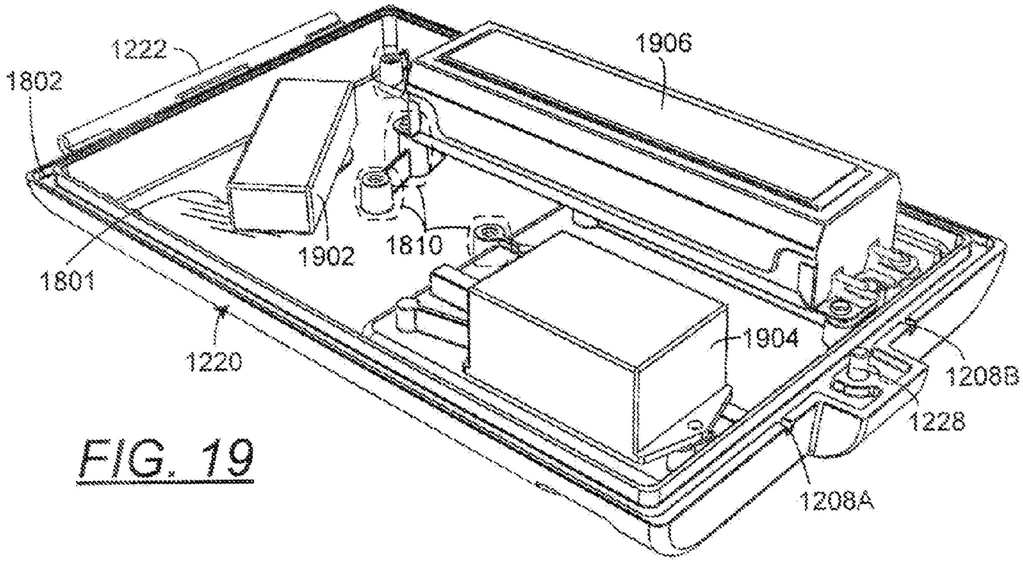
FIG. 19 provides a top interior view of the cover of FIG. 18, with mounted circuitry.

FIG. 19 illustrates a top interior view of the cover 1220, with mounted circuit modules 1902, 1904, and 1906. As examples of circuit modules, the module 1902 includes sensor circuitry, the module 1904 includes rectification and filtering circuitry, and the module 1906 includes driver circuitry. In one embodiment, the sensor module 1902 is configured to sense motion, for example, the rectification and filtering module 1904 is configured to rectify and filter a line voltage into a direct current voltage, and the driver module 1906 is configured to provide electrical power at a particular voltage and current specification based on requirements of the light source 1208. It is noted that the functions and arrangement of the circuit modules 1902, 1904, and 1906 illustrated in FIG. 19 are provided by way of example only and various other functions, configurations, and arrangements are within the scope and spirit of the embodiments described herein. As illustrated in FIG. 19, the circuit modules 1902, 1904, and 1906 are mounted to the plurality of mount points 1810, although other means for mounting circuit modules to the cover 1220 may be relied upon.

Figure 20:
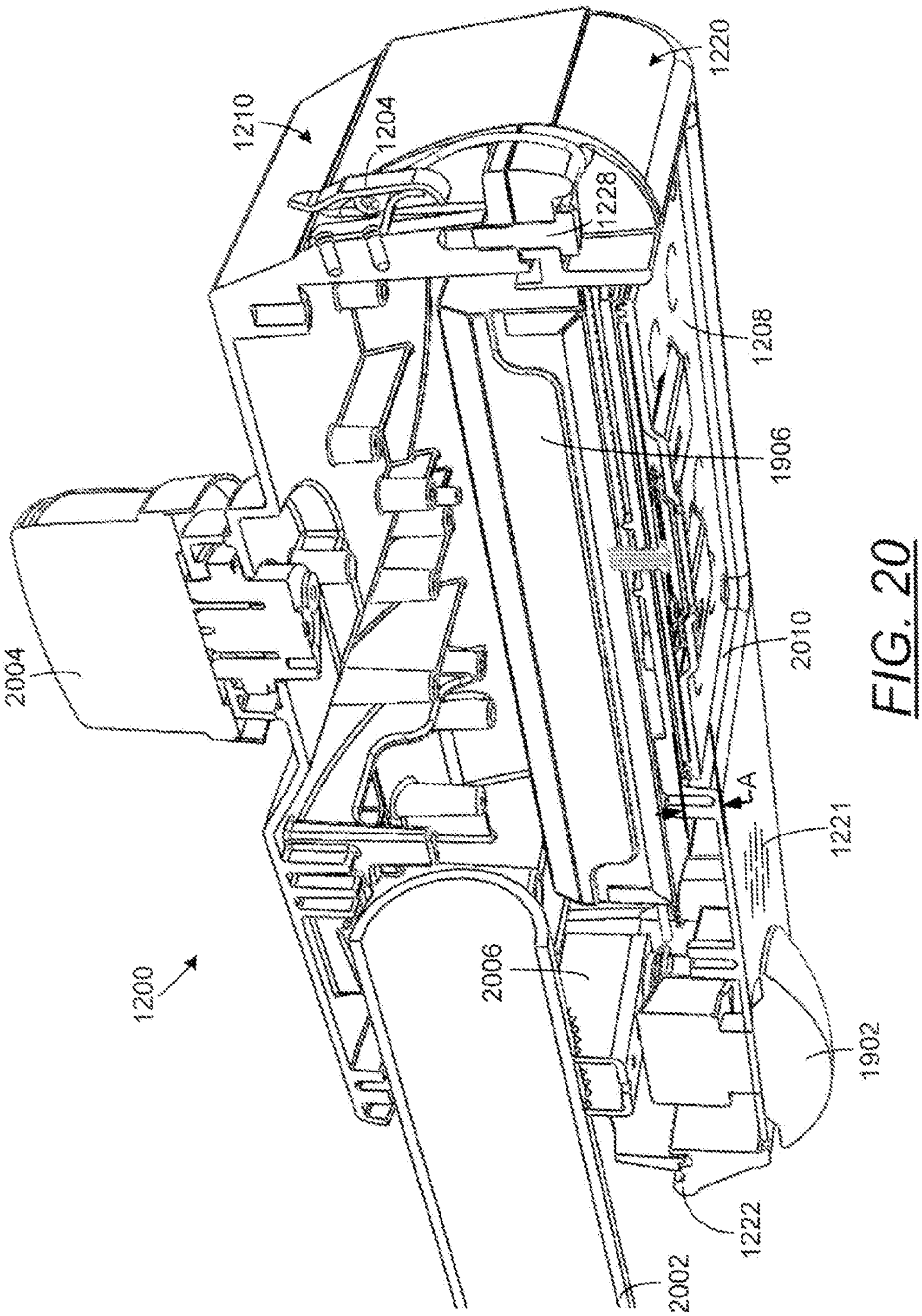
FIG. 20 provides a side cutaway perspective view of the power door lighting fixture of FIG. 12A in accordance with certain example embodiments.

FIG. 20 provides a side cutaway perspective view of the power door lighting fixture 1200. As illustrated, the lighting fixture 1200 is mounted to the mounting pole 2002 by the mounting assembly hardware 2006. More particularly, the cabinet 1210 is positioned such that the mounting pole 2002 extends through the mounting through-hole 1420 of the cabinet 1210, and the mounting assembly hardware 2006 clamps to the mounting pole 2002 to secure the cabinet 1210 (and the cover 1220) to the pole 2002. The mounting assembly hardware 2006 is secured to the cabinet 1210 and includes, in various embodiments, an adjustable clamp or similar means to securely clamp, fasten, or attach to a pole or rod, for example. In other embodiments, the mounting assembly hardware 2006 may include other mechanical means to securely mount the lighting fixture 1200 to a mount. In example embodiments, electrical wiring is fed through the mounting pole 2002 to provide power to the circuit modules 1902, 1904, and 1906 and, in turn, to the light source 1208.

In FIG. 20, it is clear that the sensor module 1902 extends from the interior to the exterior of the lighting fixture 1200, to detect motion below the lighting fixture 1200, for example. Additionally, a daylight sensor 2004 is illustrated. The daylight sensor 2004 is mounted at the through-hole 1410 of the cabinet 1210 and detects daylight. Based on an amount (i.e., brightness/intensity) of the daylight, the daylight sensor 2004 provides one or more control signals to turn the light source 1208 on or off. For example, when the daylight sensor 2004 detects a predetermined amount of daylight, it provides a control signal to turn the light source 1208 off. Alternatively, when the daylight sensor 2004 detects an insufficient amount of daylight for visibility, for example, it provides a control signal to turn the light source 1208 on.

As also illustrated in FIG. 20, the cover 1220 includes a recessed mounting tray that defines a surface recessed into the cover 1220 from the exterior surface 1221 of the cover 1220. The mounting tray is defined by sidewalls 2010 which extend for a predetermined distance "A" from a recessed tray to the external surface 1221 of the cover 1220, as illustrated in FIG.

20. In example embodiments, the light source 1208 is affixed to the cover 1220 at the recessed tray within an area defined by the tray. In one aspect, the recessed mounting tray is formed to prevent light from the light source 1208 from spilling over into the sky. That is, the recessed mounting tray and the sidewalls 2010 assist with directing light from the light source 1208 toward the ground, for example, and away from the sky. In various embodiments, the size A of the sidewalls 2010 may be greater or smaller than the representative embodiment in FIG. 20. Further, in various embodiments, the recessed mounting tray may take the form of various shapes and sizes depending upon the shape and size of the light source to be mounted.

Although electrical wiring between and among the circuit modules 1902, 1904, and 1906 is not illustrated in FIG. 20, it is noted that, in example embodiments, the cover 1220 may be electrically connected to and disconnected from the remainder of the lighting fixture 1200 by only a single electrical connector. In other words, it is noted that the cover 1220 may be electrically disconnected from the lighting fixture 1200 by the disconnection of only one electrical connection, for quick removal of the cover 1220 from the lighting fixture 1200. Similarly, the cover 1220 may be electrically connected to the lighting fixture 1200 by the connection of only one electrical connection, for quick installation of the cover 1220 to the lighting fixture 1200.

Figure 21:
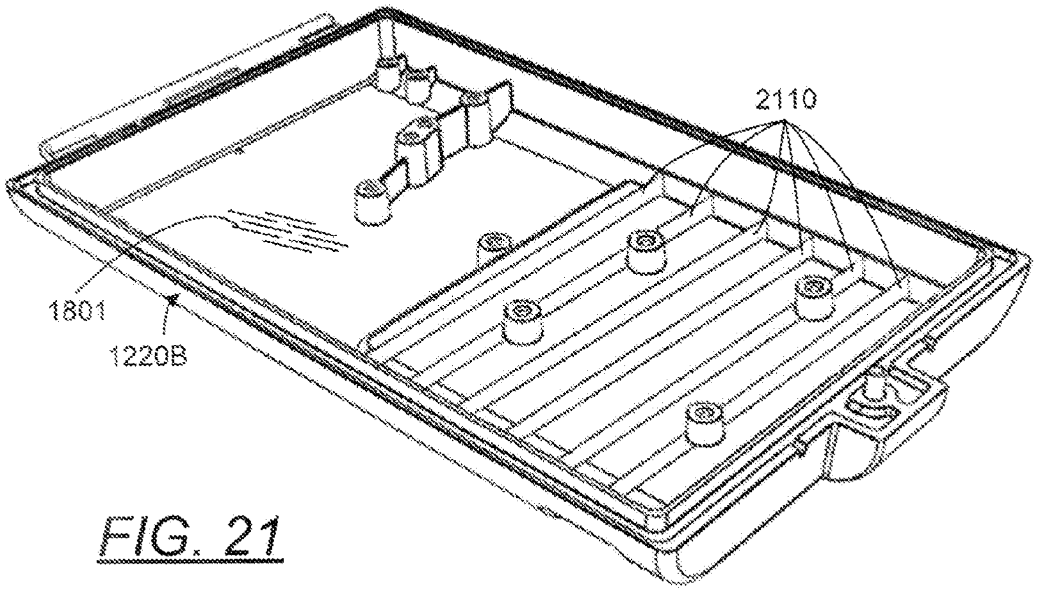
FIG. 21 provides a top interior view of a cover of a power door lighting fixture in accordance with certain example embodiments.

FIG. 21 provides a top interior view of an alternative cover 1220B of the power door lighting fixture 1200 in accordance with another example embodiment. As compared to the cover 1220, the cover 1220B further includes heat-conducting fins 2110. The heat-conducting fins 2110 are provided to absorb heat dissipated from a light source such as the light source 1208, via conduction. The heat-conducting fins 2110 are also provided to dissipate heat from a light source, via convection. In various embodiments, the heat conducting fins, which may vary in number and position from those illustrated in the example embodiment of FIG. 21, may traverse the interior of the cover 1220B in various directions and angles. In is noted that, in certain embodiments, the heat-conducting fins traverse the interior surface 1801 of the cover 1220B at a location that corresponds to a position of a recessed mounting tray of the cover 1220B.

Figure 22:
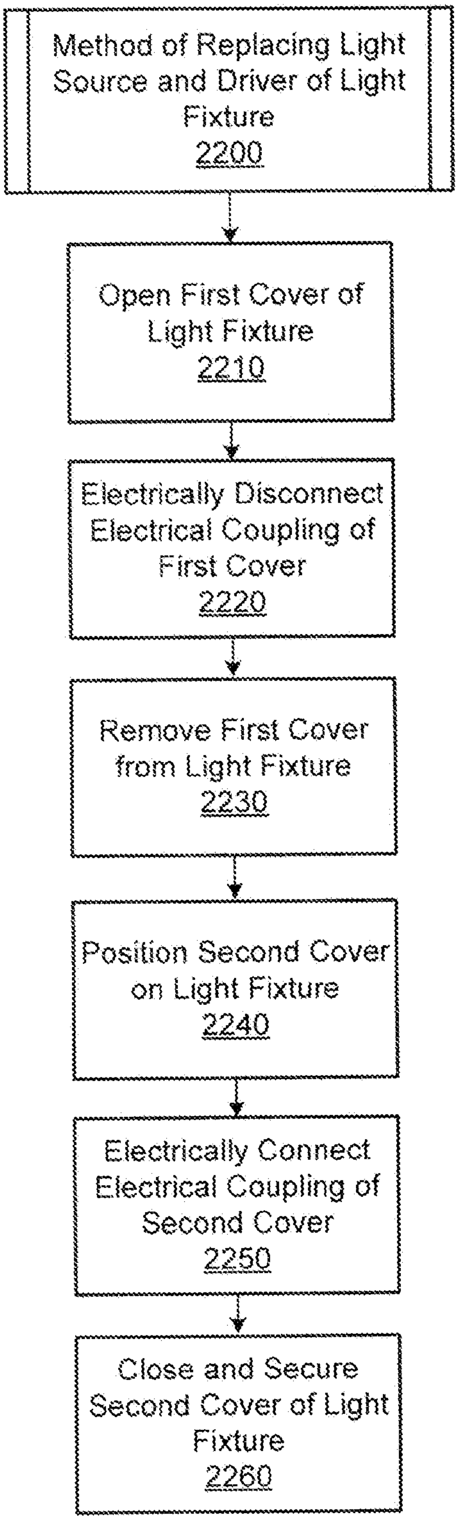
FIG. 22 provides a process flow diagram of a method of replacing a light source and driver of a light fixture in accordance with certain example embodiments.

FIG. 22 provides an example process flow diagram of a method 2200 of replacing a light source and driver of a light fixture. It is noted that, while the method 2200 is described below in the context of replacement of the cover 1210 of the lighting fixture 1200 with the cover 1220B, the method 2200 may be performed with other fixtures and covers.

The method 2200 begins at step 2210, where a first cover of a cabinet of a lighting fixture is opened. For example, the cover 1220 of the lighting fixture 1200 may be opened by opening the attachment clip 1204 of the cabinet 1210, as described above. After the first cover is opened, the method 2200 proceeds to step 2220, where an electrical coupling of the first cover is disconnected from the light fixture. That is, in an example embodiment, electrical disconnection at step 2220 is achieved by disconnecting a single electrical connector that electrically connects or couples circuitry mounted to the first cover, for example, from the lighting fixture.

After the electrical disconnection at step 2220, the first cover is removed from the lighting fixture at step 2230. For example, at step 2230, the cover 1220 may be removed from the lighting fixture 1200. At step 2240, a second cover is positioned with the lighting fixture using at least one attachment feature of the second cover. With reference to the example embodiments described above, the cover 1220B may be positioned on the cabinet 1210 of the lighting fixture 1200 at step 2240 using the attachment hook 1212 of the cabinet 1210 and the attachment rod 1222 of the cover 1220B.

While the second cover is positioned on the cabinet at step 2240, an electrical coupling of the second cover is electrically connected to the cabinet at step 2250. For example, an electrical coupling, such as a single electrical connector of the cover 1220B, is electrically connected to the lighting fixture 1200 at step 2250. Once the electrical connection is made at step 2250, the second cover may be closed and secured to the cabinet of the lighting fixture at step 2260. In the context of the lighting fixture 1200, the cover 1220B is secured to the cabinet 1210 using the attachment clip 1204 of the cabinet 1210 at step 2260.

It is noted that, in the method 2200, a first light source of the first cover and a second light source of the second cover may differ from each other in voltage and/or current specifications. Yet, because both the first and second light sources and the electrical circuitry or circuit modules that provide power to the light sources are both mounted to the first and second covers, the covers may be interchanged according to the method 2200 with relative ease and, in some cases, without the need for tools.

Figure 23A:
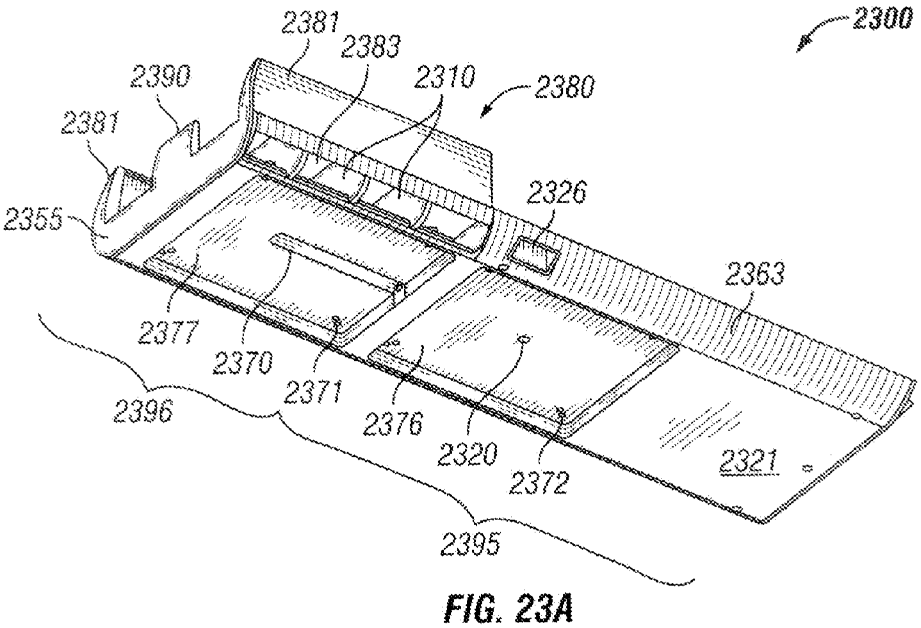
FIGS. 23A-23E provide various views of another door in accordance with certain example embodiments.
Figure 23B:
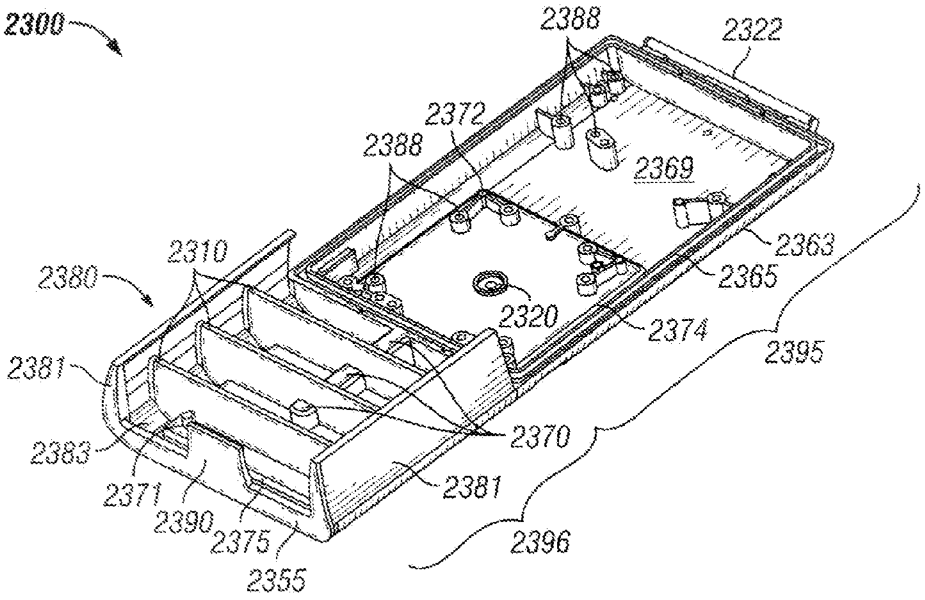
Figure 23C:
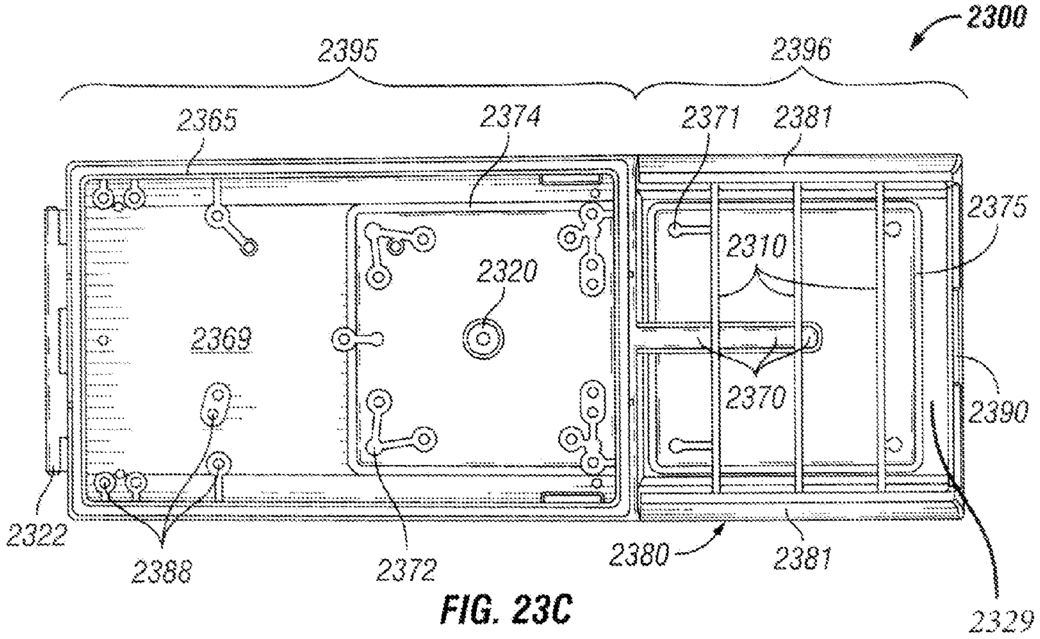
Figure 23D:
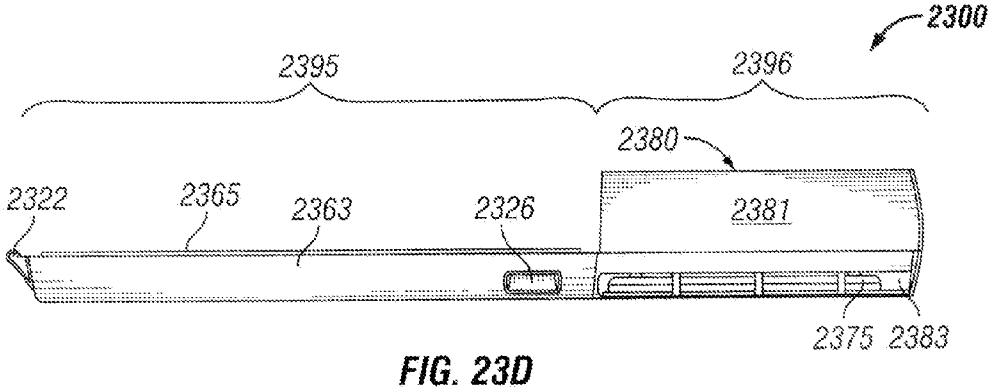
Figure 23E:
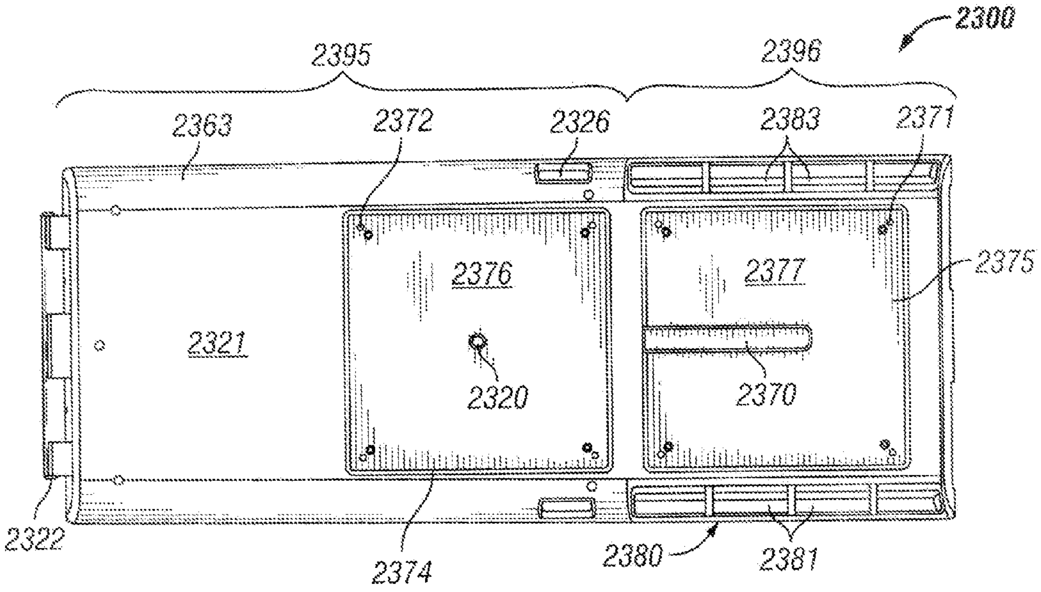

FIGS. 23A-23E provide various views of another door 2300 in accordance with certain example embodiments. Specifically, FIG. 23A shows a bottom perspective view of the door 2300. FIG. 23B shows a top perspective view of the door 2300. FIG. 23C shows a top view of the door 2300. FIG. 23D shows a side view of the door 2300. FIG. 23E shows a bottom view of the door 2300. In one or more embodiments, one or more of the features shown in FIGS. 23A-23E may be omitted, repeated, and/or substituted. Accordingly, embodiments of lighting fixture doors should not be considered limited to the specific arrangements of components shown in FIGS. 23A-23E.

The example door 2300 of FIGS. 23A-23E, while differing from other doors (covers) described above, such as cover 1220 of FIGS. 12A-20 and cover 1220B of FIG. 21, includes a number of features and/or components that are also included in the other covers described herein. The description for any component (e.g., wiring conduit 2320, attachment recesses 2326) of FIGS. 23A-23E not provided below can be considered substantially the same as the corresponding component (e.g., wiring conduit 1820, attachment recesses 1226) described above. The numbering scheme for the components of FIGS. 23A-23E parallel the numbering scheme for the components shown and described above in the preceding figures in that each component is a three or four digit number, where similar components between the door 2300 and the other covers (e.g., cover 1220) have the identical last two digits.

In certain example embodiments, the door 2300 is a single piece that is formed from a mold or similar process. Alternatively, the door 2300 can be two or more pieces that are mechanically coupled to each other. In any case, the door 2300 can be made without any extrusions. The door 2300 can have two portions: A base portion 2395 and a cantilever portion 2396. If the door 2300 is made of multiple pieces that are mechanically coupled to each other, one piece can be the base portion 2395, and another piece can be the cantilever portion 2396. The base portion 2395 of the door 2300 can be substantially the same size (e.g., length, width, height) as the covers (e.g., cover 1220, cover 1220B) described above. In such a case, the length of the door 2300 exceeds the length of the cover 1220 and the cover 1220B by approximately the length of the cantilever portion 2396 of the door 2300.

The door 2300 can include two or more light source receiving areas disposed on the bottom of the door 2300. For example, as shown in FIGS. 23A-23E, the door 2300 can include light source receiving area 2377 (disposed on the cantilever portion 2396) and light source receiving area 2376 (disposed on the base portion 2395). The light source receiving area 2377 can be substantially the same size as, or a different size than, the light source receiving area 2376. The light source receiving area 2377 is disposed at the distal end of the door 2300 (as part of the cantilever portion 2396), and light source receiving area 2376 is disposed in series with the light source receiving area 2377 toward the proximal end of the door 2300 (but at the distal end of the base portion 2395). Each light source receiving area of the door 2300 can be configured to receive a light source.

In certain example embodiments, the base portion 2395 of the door 2300 includes one or more of a number of light source receiving area 2376, which can each be the same or a different size and/or shape. The base portion 2395 can include, in addition to the one or more light source receiving areas 2376, an exterior surface 2321. In such a case, the exterior surface 2321 can be disposed at the proximal end of the base portion 2395. In certain example embodiments, a portion of the exterior surface 2321 can be disposed at the distal end of the base portion 2395, between the light source receiving area 2376 and the light source receiving area 2377. One or more of a number of bosses 2388 can be disposed on the top of the base portion 2395 (e.g., the top side 2369 of the exterior surface 2321, the top 2374 of the light source receiving area 2376). Such bosses 2388 can be used to receive one or more fastening devices (e.g., screws, bolts) that are disposed in and/or traverse a portion of the cabinet 2410 of the lighting fixture 2400 (as described below with respect to FIGS. 24A-24C).

In certain example embodiments, one or more receiving features 2372 can traverse some or all of the light source receiving area 2376. Each receiving feature 2372 can be configured to receive a fastening device used to mechanically couple a light source to the light source receiving area 2376. In some cases, the receiving features 2372 can extend beyond the top end 2374 of the light source receiving area 2376.

In certain example embodiments, one or more wiring conduits 2320 can be disposed in the top 2374 of the light source receiving area 2376. The wiring conduit 2320 can traverse the light source receiving area 2376 and be shaped and/or sized to allow one or more wires, connectors, and/or other power-transfer devices to provide power from a power source (e.g., LED driver) disposed in the cabinet 2410 to a light source disposed in the light source receiving area 2376. There can be one or multiple wiring conduits 2320 disposed in the top of each light source receiving area 2376 in the base portion 2395.

In addition, one or both sides along the length of the base portion 2395 can have a side member 2363. The side member 2363 can extend from the exterior surface 2321 and/or an edge of the light source receiving area 2376 at some angle (e.g., 90°). The side members 2363 can be rounded (as shown in FIGS. 23A-23E) or meet at a point with the exterior surface 2321 and/or an edge of the light source receiving area 2376. A protrusion 2365 can extend in a direction (e.g., upward) from the top of the side members 2363, the top of the distal end of the top 2374 of the light source receiving area 2376 and/or the exterior surface 2321 at the distal end of the base portion 2395, and/or the top 2369 of the proximal end of the exterior surface 2321.

The protrusion 2365 can be disposed around some or all of the top perimeter of the base 2395. The protrusion 2365 can include one or more of a number of features (e.g., tabs, slots, ridges) that help the door 2300 mechanically couple to the cabinet 2410. The protrusion 2365 can be shaped and/or sized to mate with a corresponding receiving feature disposed along a bottom of the cabinet 2410 of the lighting fixture 2400. The protrusion 2365 can be used to prevent water, dirt, and other contaminants from entering the lighting fixture 2400 when the base portion 2395 is mechanically coupled to the cabinet 2410.

The base portion 2395 can also include one or more attachment features 2322 that are disposed along one or more portions (e.g., the outer end of the distal end of the exterior surface 2321) of the base portion 2395. The attachment feature 2322 can be used to moveably (e.g., hingedly) couple to a corresponding attachment feature 2412 of the cabinet 2410. The base portion 2395 can further include one or more attachment recesses 2326 disposed on one or more side members 2363 of the base portion 2395. The attachment recesses 2326 can be used to receive a corresponding securing clip 2414 of the cabinet 2410.

In certain example embodiments, the cantilever portion 2396 can include more than one light source receiving area, which can alter the size (e.g., extend the length, extend the width) of the cantilever portion 2396. For example, the cantilever portion 2396 can have three additional light source receiving areas that are substantially identical to light source receiving area 2377. Each light source receiving area can have the same or different size and/or shape as the other light source receiving areas of the door 2300.

Multiple light source receiving areas 2377 of the cantilever portion 2396 can be arranged in series along the length of the cantilever portion 2396. For example, if there are two light source receiving areas 2377 having the same shape and size, one of the light source receiving areas 2377 can be disposed at the distal end of the cantilever portion 2396, and the other light source receiving area 2377 can be disposed in series along the length of the cantilever portion 2396 at the proximal end of the cantilever portion 2396. Alternatively, the light source receiving areas can be arranged in some other manner along the cantilever portion 2396. In some cases, the base portion 2395 can, in addition or the alternative, include multiple light source receiving areas, except that the shape and size of the base portion 2395 does not change substantially.

The cantilever portion 2396 can also include a heat sink assembly 2380. The heat sink assembly 2380 can include one or more of a number of larger heat-conducting fins 2381 and/or smaller heat-conducting fins 2310 that are disposed on the top of the cantilever portion 2396. For example, the cantilever portion 2396 of FIGS. 23A-23E includes a total of five heat-conducting fins (two larger heat-conducting fins 2381 and three smaller heat-conducting fins 2310). In such a case, the two larger heat-conducting fins 2381 can form an outer edge along the length of some or all of the cantilever portion 2396. The larger heat-conducting fins 2381 can have a length and/or height that is larger than the length and/or height of the smaller heat-conducting fins 2310. If the larger heat-conducting fins 2381 can form an outer edge along the length of some or all of the cantilever portion 2396, then the height of the heat-conducting fins 2381 can be substantially the same as the height of a cabinet 2410 of an outdoor lighting fixture 2400.

In certain example embodiments, the smaller heat-conducting fins 2310 abut against the larger heat-conducting fins 2381 at some angle (e.g., substantially 90° (as shown in FIGS. 23A-23E), 45°,135°). As such, the smaller heat-conducting fins 2310 can be thermally coupled to one or both larger heat-conducting fins 2381. The smaller heat-conducting fins 2310 can be disposed on the top 2375 of the light source receiving area 2377. In such a case, the smaller heat-conducting fins 2310 are thermally coupled to the top 2375 of the light source receiving area 2377. Each smaller heat-conducting fin 2310 can be linear (as shown in FIG. 23A-23E), curved, sawtoothed, random, and/or have one or more of a number of other shapes and/or contours. A smaller heat-conducting fin 2310 can have the same or different shapes and/or contours compared to the other smaller heat-conducting fins 2310. The height of the smaller heat-conducting fins 2310 can be less than (as shown in FIGS. 23A-23E), the same as, or more than the height of the larger heat-conducting fins 2381.

The heat sink assembly 2380 of the cantilever portion 2396 can also include an end piece 2355 that is disposed along the distal end of the cantilever portion 2396. The end piece 2355 can abut against the larger heat-conducting fins 2381 at some angle (e.g., substantially 90° (as shown in FIGS. 23A-23E), 45°, 135°). As such, the end piece 2355 can be thermally coupled to one or both larger heat-conducting fins 2381. The end piece 2355 can be linear (as shown in FIG. 23A-23E), curved, sawtoothed, random, and/or have one or more of a number of other shapes and/or contours. For example, as shown in FIGS. 23A and 23B, the end piece 2355 can have an elevated height at each end and a raised middle portion 2390 relative to the rest of the end piece 2355. Some or all portions of the heat sink assembly 2380 can be made of a thermally conductive material, including but not limited to metal.

In certain example embodiments, the cantilever portion 2396 also includes one or more vents 2383 disposed between the heat sink assembly 2380 and the light source receiving area 2377. The vents 2383 allow air flow over the heat sink assembly 2380, helping to dissipate heat absorbed by one or more portions of the heat sink assembly 2380. Each vent 2383 can traverse the cantilever portion 2396 adjacent to the light source receiving area 2377 and one or more heat-conducting fins (e.g., larger heat-conducting fins 2381, smaller heat-conducting fins 2310). For example, in this case, there is a vent 2383 disposed on each side of the cantilever portion 2396 between the larger heat-conducting fins 2381 and light source receiving area 2377.

The air flowing through the vents 2383 can occur naturally and/or using one or more air moving devices (e.g., fan, blower) (not shown). Under natural conditions, the heat collected by the larger heat-conducting fins 2381 and/or smaller heat-conducting fins 2310 is dissipated into the surrounding air. As a result, the air surrounding the larger heat-conducting fins 2381 and/or the smaller heat-conducting fins 2310, when heated, becomes lighter than the rest of the air, such as the air on the bottom side of the door 2300. The lighter air on the top of the door 2300 creates a pressure differential with the surrounding air that is not heated. In such a case, the vents 2383 facilitate the flow of cooler, heavier air from the bottom of the door 2300 to the top of the door 2300 to replace the lighter, heated air. In turn, the cooler air that flows through the vents 2383 absorbs heat dissipated by the larger heat-conducting fins 2381 and/or smaller heat-conducting fins 2310 above the door 2300. Thus, this convection process continues when the light sources operate, dissipating heat to the larger heat-conducting fins 2381 and/or the smaller heat-conducting fins 2310.

Figure 24A:
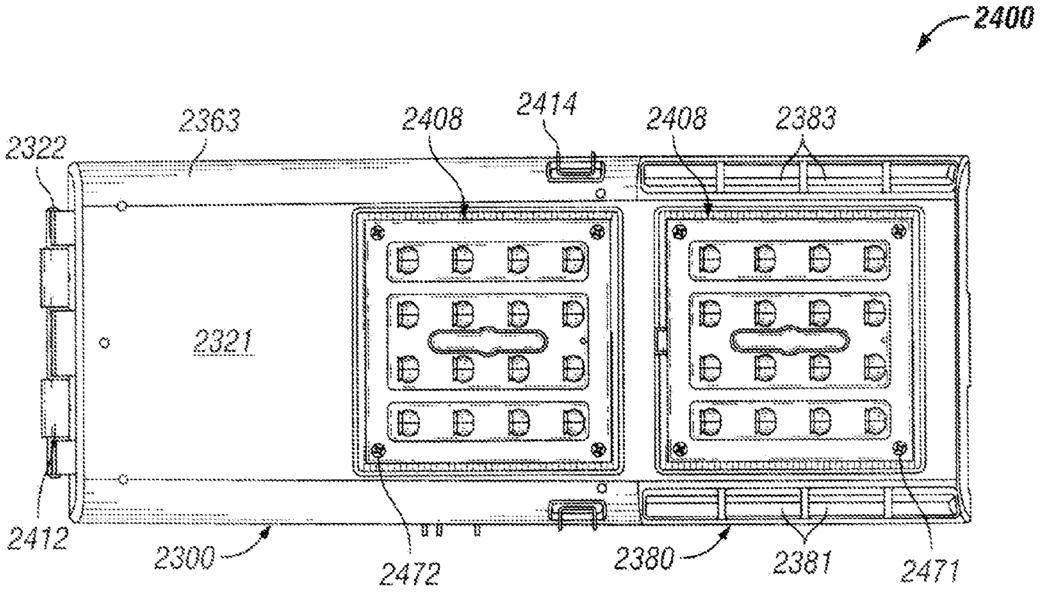
FIGS. 24A-24C provide various views of an outdoor lighting fixture that includes the example door of FIGS. 23A-23E in accordance with certain example embodiments.
Figure 24B:
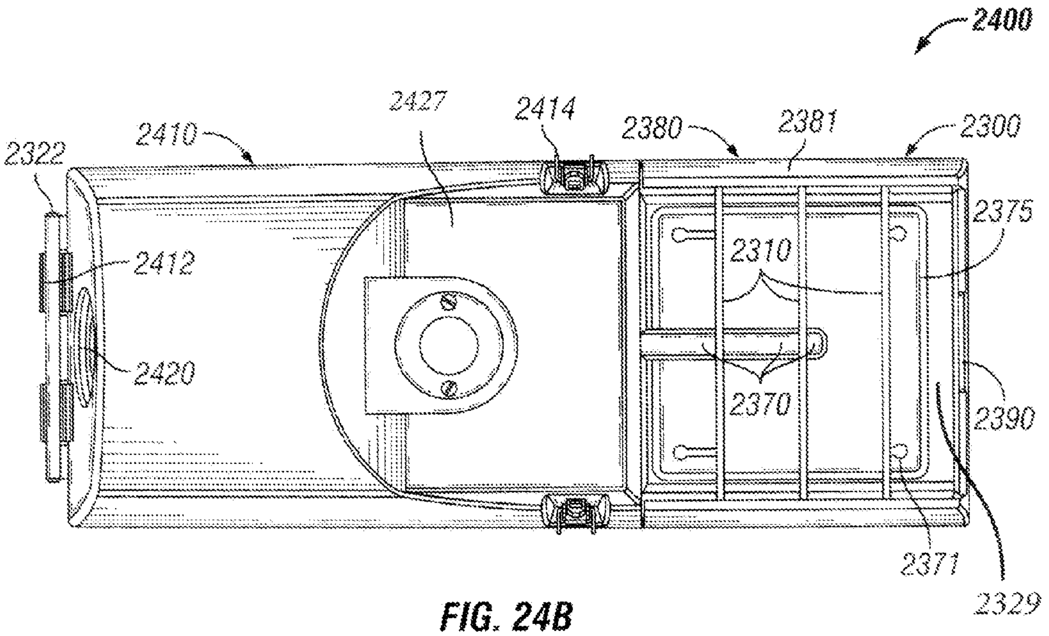
Figure 24C:
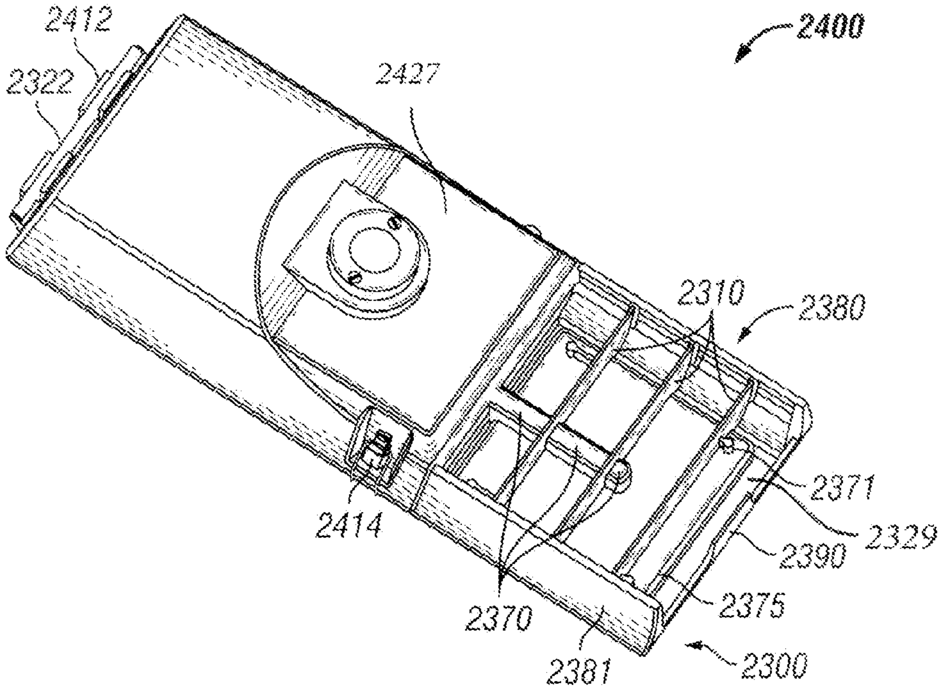

In addition, or in the alternative, the vents 2383 can be used to facilitate the drainage of moisture from one or more portions of the top surface 2329 of the cantilever portion 2396 of the door 2300, the top surface 2427 of the cabinet (as shown in FIGS. 24B and 24C below), and/or any other component of the outdoor lighting fixture coupled to the top end of the door 2300. For example, when the outdoor lighting fixture is exposed to rain, the vents 2383 can be positioned in such a way relative to one or more features (e.g., the top 2375 of the light source receiving area 2377) on the top surface 2329 of the cantilever portion 2396 of the door 2300, the top surface 2427 of the cabinet, and/or any other component of the outdoor lighting fixture coupled to the top end of the door 2300 as to allow the water to flow through the vents 2383 toward the ground. Thus, the vents 2383 can help prevent moisture from compromising one or more portions of the outdoor lighting fixture, which can cause, for example, corrosion or an electrical short. In other words, the vents 2383 can be used for convection and/or drainage.

In certain example embodiments, the shape and/or size (e.g., the length, the width, the height) of the vents 2383 can be any suitable shape and/or size to facilitate effective convectional air flow and/or drainage of moisture for the door 2300 and/or the associated outdoor lighting fixture. Because the smaller heat-conducting fins 2310 abut against the larger heat-conducting fins 2381 at an angle, the ends of the smaller heat-conducting fins 2310 can divide the vents 2383 into a number of portions.

In certain example embodiments, the cantilever portion 2396 can also include one or more wireways 2370. Each wireway 2370 can be disposed in the top 2375 of the light source receiving area 2377. The wireway 2370 can traverse the light source receiving area 2377 and form a cavity that is shaped and/or sized to allow one or more wires, conductors, connectors, and/or other power-transfer devices to be disposed therein and provide power from a power source (e.g., LED driver) disposed in the cabinet 2410 to a light source disposed in the light source receiving area 2377. In such a case, as shown in FIG. 23A, the cavity formed by the wireway 2370 can be open at the light source receiving area 2377 (the bottom side of the door 2300) and enclosed at the top 2375 of the light source receiving area 2377. There can be one or multiple wireways 2370 disposed in the top of each light source receiving area 2377 in the cantilever portion 2396.

For a light source receiving area 2377 disposed at the proximal end of the cantilever portion 2396, the wireway 2370 can be disposed between the proximal edge of the cantilever portion 2396 (where the cantilever portion 2396 joins the base portion 2395) and a top end 2375 of the light source receiving area 2377. When there are multiple light source receiving areas 2377 in the cantilever portion 2396, one or more wireways 2370 can be disposed at various places along the top of the cantilever portion 2396. For example, if the multiple light source receiving areas 2377 are disposed in series along the length of the cantilever portion 2396, there can be one wireway 2370 that is disposed between the proximal edge of the cantilever portion 2396 and the top end 2375 of the distally-placed light source receiving area 2377. In such a case, the wireway 2370 can be disposed across the length of the top end 2375 of the proximally-placed light source receiving area 2377, and a wiring conduit (not shown, but substantially similar to the wiring conduit 2373) can traverse the proximally-placed light source receiving area 2377.

As another example, if the multiple light source receiving areas 2377 are disposed in series along the length of the cantilever portion 2396, there can be multiple wireways 2370. One wireway 2370 can be between the proximal edge of the cantilever portion 2396 and the top end 2375 of the proximally-placed light source receiving area 2377. Another wireway 2370 can be disposed between the top end 2375 of the proximally-placed light source receiving area 2377 and the top end 2375 of the distally-placed light source receiving area 2377.

In certain example embodiments, one or more receiving features 2371 can traverse some or all of the light source receiving area 2377. Each receiving feature 2371 can be configured to receive a fastening device used to mechanically couple a light source to the light source receiving area 2377. In some cases, the receiving features 2371 can extend beyond the top end 2375 of the light source receiving area 2377.

FIGS. 24A-24C provide various views of an outdoor lighting fixture 2400 that includes the example door 2300 of FIGS. 23A-23E in accordance with certain example embodiments. Specifically, FIG. 24A shows a bottom view of the outdoor lighting fixture 2400. FIG. 24B shows a top view of the outdoor lighting fixture 2400. FIG. 24C shows a perspective view of the outdoor lighting fixture 2400. In one or more embodiments, one or more of the features shown in FIGS. 24A-24C may be omitted, repeated, and/or substituted. Accordingly, embodiments of outdoor lighting fixtures should not be considered limited to the specific arrangements of components shown in FIGS. 24A-24C.

The example lighting fixture 2400 of FIGS. 24A-24C can include a cabinet 2410 mechanically coupled to the door 2300 of FIGS. 23A-23E. The cabinet 2410, while differing from other cabinets described above, such as cabinet 210 of FIGS. 2B-10 and cabinet 1210 of FIGS. 12A-20, includes a number of features and/or components that are also included in the other cabinets described herein. The description for any component (e.g., light source 2408, securing clips 2414) of FIGS. 24A-24C not provided below can be considered substantially the same as the corresponding component (e.g., light source 1208, securing clips 214) described above. The numbering scheme for the components of FIGS. 24A-24C parallel the numbering scheme for the components shown and described above in the preceding figures in that each component is a three or four digit number, where similar components between the cabinet 2410 and the other cabinets (e.g., cabinet 1210) can have the identical last two digits.

Referring to FIGS. 1-24C, there are two light sources 2408 that are mechanically coupled to light source receiving areas of the door 2300. Specifically, at the distal end of the door 2300 (on the cantilever portion 2396), a light source 2408 is mechanically coupled to the light source receiving area 2377 using a number of fastening devices 2471 disposed within the receiving features 2371. Similarly, toward the middle of the door 2300 (at the distal end of the base portion 2395), a light source 2408 is mechanically coupled to the light source receiving area 2376 using a number of fastening devices 2472 disposed within the receiving features 2372.

The door 2300 can be mechanically coupled to the cabinet 2410 in more than one location using more than one coupling method. For example, the attachment feature 2412 disposed at the proximal end of the cabinet 2410 can be coupled to the attachment feature 2322 disposed at the proximal end of the base portion 2395 of the door 2300 to allow the cabinet 2410 and the door 2300 to be movably (e.g., hingedly) coupled to each other. As another example, the securing clips 2414 disposed on each side of the cabinet 2410 can be mechanically coupled to the attachment recesses 2326 disposed on each side of the side member 2363 of the door 2300.

In certain example embodiments, one or more components of the outdoor lighting fixture 2400 are disposed inside the cabinet 2410, hidden from view. For example, one or more power sources can be disposed in the cabinet 2410, where a power source is electrically coupled to at least one light source 2408. Alternatively, the power source (and/or one or more other electrical components of the outdoor lighting fixture 2400) can be disposed in the door 2300. Each light source 2408 can include at least one LED and an optical device (e.g., a diffuser, a lens) that covers the at least one LED. When the light source 2408 is disposed in a light source receiving area of the door 2300, the optical device of the light source 2408 can be substantially planar with the bottom surface of the door 2300. For example, for a light source 2408 disposed in light source receiving area 2376, the bottom (e.g., the optical device) of the light source 2408 can be substantially planar with the exterior surface 2321 of the base portion 2395.

As shown in FIGS. 24A-24C, when the door 2300 is mechanically coupled to the cabinet 2410, the larger heat-conducting fins 2381 can have a height that is substantially the same as the height of the cabinet 2410. In such a case, the profile of the outdoor lighting fixture 2400 looks substantially continuous along its length. In other words, the cantilever portion 2396 blends in with the cabinet 2410 to extend the length of the outdoor lighting fixture 2400.

Figure 25:
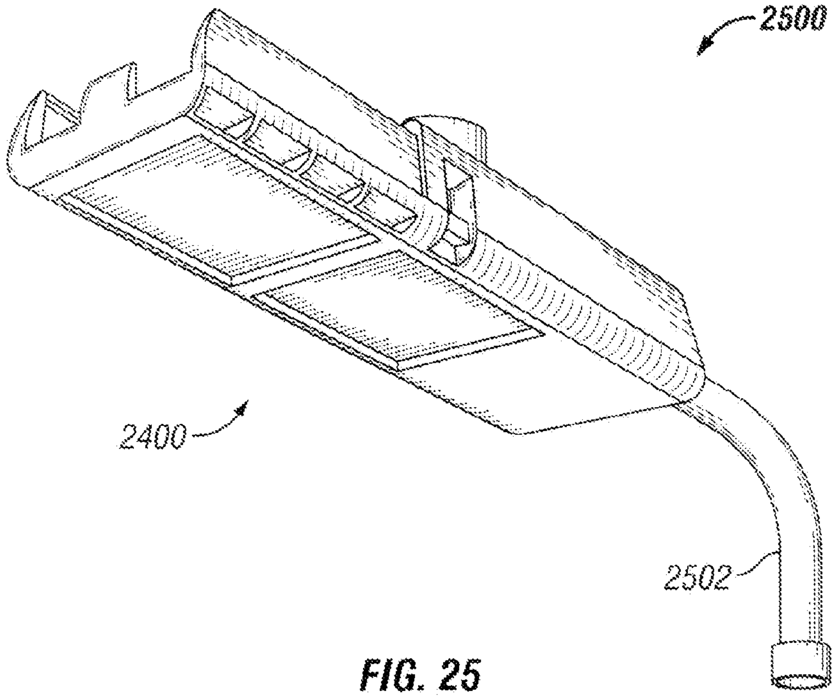
FIG. 25 provides a perspective view of the outdoor lighting fixture of FIGS. 24A-24C that includes a mounting pole in accordance with certain example embodiments.

FIG. 25 provides a perspective view of a lighting system 2500 that includes the outdoor lighting fixture 2400 of FIGS. 24A-24C and a mounting pole 2502 in accordance with certain example embodiments. Specifically, the mounting pole 2502 can traverse the mounting through-hole 2420 disposed in the proximal end of the housing 2410. The distal end of the mounting pole 2502 can be mechanically coupled to the cabinet 2410 and/or the door 2300, and the proximal end of the mounting pole 2502 can be mechanically coupled to some other component, including but not limited to a wall, rooftop, a road sign, an overpass, and another pole.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A door for an outdoor lighting fixture, the door comprising:

a base portion comprising a first light source receiving area and at least one attachment recess and having a length substantially equal to a length of a cabinet of the outdoor lighting fixture, wherein the first light source receiving area is disposed on a bottom of the base portion; and a cantilever portion disposed at a distal end of the base portion and comprising a second light source receiving area disposed on a bottom side of the cantilever portion, wherein the at least one attachment recess is configured to receive at least one securing clip of the cabinet of the outdoor lighting fixture, wherein the first light source receiving area is configured to receive a first light source, wherein the second light source receiving area is configured to receive a second light source, wherein the cantilever portion extends beyond the cabinet away from the distal end of the base portion, wherein the first light source receiving area is adjacent to the second light source receiving area, and wherein the base portion and the cantilever portion are configured to open away from the cabinet when the at least one securing clip is decoupled from the at least one attachment recess.

2. The door of claim 1, wherein the first light source is positioned toward the distal end of the base portion.

3. The door of claim 1, wherein the base portion and the cantilever portion are formed from a single piece.

4. The door of claim 3, wherein the base portion and the cantilever portion are formed without an extrusion.

5. The door of claim 1, wherein the cantilever portion further comprises:

a third light source receiving area disposed on the bottom side of the cantilever portion, wherein the second light source receiving area and the third light source receiving area are laid out in series along a length of the cantilever portion, wherein the third light source receiving area is disposed at a distal end of the cantilever portion.

6. The door of claim 1, wherein the cantilever portion further comprises:

a wireway disposed on a top of the cantilever portion, wherein the wireway is disposed between a proximal edge of the cantilever portion and a top end of a third light source receiving area, wherein the wireway is further disposed across a top end of the second light source receiving area, and wherein the wireway forms a cavity through which a power transfer device can be disposed.

7. The door of claim 1, wherein the cantilever portion further comprises:

a heat sink assembly comprising a plurality of heat-conducting fins and disposed on a top of the cantilever portion; and at least one vent disposed between the heat sink assembly and the second light source receiving area.

8. The door of claim 7, wherein the at least one vent traverses the cantilever portion adjacent to the second light source receiving area and a first heat-conducting fin of the plurality of heat-conducting fins.

9. The door of claim 8, wherein the first heat-conducting fin forms an outer edge along a length of the cantilever portion, wherein the first heat-conducting fin has a height that is substantially the same as a height of the cabinet of the outdoor lighting fixture.

10. The door of claim 9, wherein a second heat-conducting fin of the plurality of heat-conducting fins is thermally coupled to the first heat-conducting fin and a top end of the second light source receiving area.

11. The door of claim 1, wherein the cantilever portion further comprises:

a wireway disposed on a top of the cantilever portion, wherein the wireway is disposed between a proximal edge of the cantilever portion and a top end of the second light source receiving area, and wherein the wireway forms a cavity through which a power transfer device can be disposed.

12. An outdoor lighting system, comprising:

a mounting pole;

a cabinet mechanically coupled to the mounting pole, wherein the cabinet has a length and comprises at least one securing clip;

a door mechanically coupled to the cabinet, wherein the door comprises:

a base portion having substantially the length and comprising a first light source receiving area and at least one attachment recess, wherein the first light source receiving area is disposed on a bottom of the base portion, and wherein the at least one attachment recess receives the at least one securing clip to mechanically couple the base portion to the cabinet; and a cantilever portion disposed at a distal end of the base portion and comprising a second light source receiving area disposed on a bottom side of the cantilever portion, wherein the cantilever portion extends beyond the cabinet away from the distal end of the base portion;

a first light source disposed within the first light source receiving area of the base portion; and a second light source disposed within the second light source receiving area of the cantilever portion, wherein the door opens away from the cabinet when the at least one securing clip is decoupled from the at least one attachment recess, and wherein the first light source is adjacent to the second light source.

13. The outdoor lighting system of claim 12, further comprising:

a power source electrically coupled to the first light source and the second light source, wherein the power source is disposed in the door.

14. The outdoor lighting system of claim 12, wherein the base portion comprises a first attachment feature disposed at a proximal end of the base portion, wherein the cabinet comprises a second attachment feature disposed at a proximal end of the cabinet, and wherein the first attachment feature hingedly couples to the second attachment feature.

15. The outdoor lighting system of claim 12, wherein the first light source comprises at least one light-emitting diode (LED) and an optical device that covers the at least one LED.

16. The outdoor lighting system of claim 15, wherein the first light source, when disposed in the first light source receiving area, is substantially planar with the bottom of the base portion.

17. The outdoor lighting system of claim 12, wherein the cantilever portion further comprises:

a heat sink assembly comprising a plurality of heat-conducting fins and disposed on a top of the cantilever portion; and at least one vent disposed between the heat sink assembly and the second light source receiving area.

18. The outdoor lighting system of claim 17, wherein the at least one vent traverses the cantilever portion adjacent to the second light source receiving area and a first heat-conducting fin of the plurality of heat-conducting fins.

19. The outdoor lighting system of claim 18, wherein the cabinet and the cantilever portion of the door each comprise a top surface that directs moisture to flow toward the at least one vent.

20. The outdoor lighting system of claim 17, wherein the plurality of heat-conducting fins is made without extrusion.

* * * * *